United States Patent [19]
Caceres et al.

[11] Patent Number: 6,167,133
[45] Date of Patent: Dec. 26, 2000

[54] ECHO DETECTION, TRACKING, CANCELLATION AND NOISE FILL IN REAL TIME IN A COMMUNICATION SYSTEM

[75] Inventors: Luis E. Caceres, Hackettstown; Linda Ann Seltzer, Lawrenceville; Cliff Sui, Berkeley Heights, all of N.J.

[73] Assignee: AT&T Corporation, New York, N.Y.

[21] Appl. No.: 08/831,874

[22] Filed: Apr. 2, 1997

[51] Int. Cl.[7] .............................. H04M 1/76; H04B 3/20
[52] U.S. Cl. .......................... 379/410; 379/406; 370/289
[58] Field of Search ..................... 379/410, 406, 379/411; 370/289, 528, 529, 286, 298, 291, 267, 268, 269; 704/208

[56] References Cited

U.S. PATENT DOCUMENTS

| | | | |
|---|---|---|---|
| 5,157,653 | 10/1992 | Genter | 370/288 |
| 5,220,610 | 6/1993 | Kane et al. | 704/233 |
| 5,307,405 | 4/1994 | Sih | 379/410 |
| 5,530,762 | 6/1996 | Jones, Jr. et al. | 381/63 |
| 5,579,497 | 11/1996 | Ehlig et al. | 375/222 |
| 5,586,275 | 12/1996 | Ehlig et al. | 395/564 |
| 5,587,998 | 12/1996 | Velardo, Jr. et al. | |
| 5,592,556 | 1/1997 | Schwed | 380/49 |
| 5,617,574 | 4/1997 | Boutaud et al. | 395/376 |
| 5,721,730 | 2/1998 | Genter | 370/288 |
| 5,727,123 | 3/1998 | McDonough et al. | 704/224 |
| 5,812,951 | 9/1998 | Ganesan et al. | 455/445 |
| 6,009,082 | 12/1999 | Caswell et al. | 370/276 |
| 6,026,150 | 2/2000 | Frank et al. | 379/90.01 |

OTHER PUBLICATIONS

Haigh et al., 'A Voice Activity Detector Based On Cepstral Analysis', Eurospeech '93 Proceedings, vol. 2, pp. 1103–1106, Sep. 1993.

*Primary Examiner*—Nguyen Vo
*Assistant Examiner*—Charles N. Appiah
*Attorney, Agent, or Firm*—Banner & Witcoff, Ltd.

[57] ABSTRACT

A method for processing telecommunications signals to alleviate echo during a voice communication between a local talker and a remote talker comprises the application of circular buffers for near and far end signals to preserve processing time. Overlapping blocks of samples are processed and indexed by incrementing the index over time to generate an array for storing magnitude coherence versus time delay between outgoing and incoming samples. Echo is clipped based on power spectral matching. The clipped echo is replaced with noise fill of at least one of two types, white noise and tonal noise, at an appropriate level. Also, crackle which comprises high energy spikes and a residual echo effect which is low energy, bursty and non-linear may be identified and replaced with noise fill.

15 Claims, 34 Drawing Sheets

-AMT.AMETRIC[] ARRAY: AVERAGED MAGNITUDE COHERENCE VERSUS TIME DELAY BETWEEN OUTGOING AND INCOMING CHANNELS.

CORRELOGRAM

TIME

DELAY

FIG. 9

| VARIABLES | DESCRIPTION |
|---|---|
| ametric[40] | array with exponential average of coherence array amt_ametric[] (ametric[]=0.90*amx_ametric[]+0.10*ametric[]) |
| ncoh | variable with number of coherence estimates (amt.ametric[]) from feo[] |
| necho | variable with number of echo detected |
| histoA[40] | array with histogram of maximum peak in amt.ametric[] |
| histoB[40] | array with histogram of second maximum peak in amt.ametric[] |
| max_hisA[2] | array with indices of the maximum two peaks of histoA[] |
| max_hisB[2] | array with indices of the maximum two peaks of histoB[] |
| max_amt[2] | array with indices of the maximum two peaks of ametric[] |
| trans[40] | array with flags for possible echo indication at each time delay |
| echo.indxA | variable with time delay index for first echo |
| echo.indxB | variable with time delay index for second echo |
| echo.valA | variable with arithmetic averaged coherence for estimated delay of first echo |
| echo.valB | variable with arithmetic averaged coherence for estimated delay of second echo |
| echo.tauA | variable with local smoothed time delay index for first echo |
| echo.tauB | variable with local smoothed time delay index for second echo |
| track.CumPosA | variable with cumulative local smoothed time delay index for first echo |
| track.CumPosB | variable with cumulative local smoothed time delay index for second echo |
| track.McountA | variable with number of tracker misses for the first echo |
| track.McountB | variable with number of tracker misses for the second echo |
| track.TcountA | variable with number of tracker hits for the first echo |
| track.TcountB | variable with number of tracker hits for the second echo |
| AlpPosA | variable with exponential average constant to update track.AvePosA (default=0.03) |
| AlpPosB | variable with exponential average constant to update track.AvePosB (default=0.03) |
| Low_Init | variable with number of coherence estimates needed to enable aggressive tracking of echo (default=16) |
| Detect_Low | flag for tracking weak echo (default is enabled) |
| MinCntA | variable with minimum number of necessary tracker hits for first echo detection (default=5) |
| MinCntB | variable with minimum number of necessary tracker hits for second echo detection (default=10) |
| MinCntA | variable with number of allowed tracker misses before resetting TcountA,McountA,TcountB and McountB (default=5) |
| MinCntB | variable with number of allowed tracker misses before resetting TcountBand and McountB (default=5) |
| Thr_Coh | variable with coherence threshold for echo detection (default=0.262) |
| Thr_His | variable with histogram threshold for echo detection (default=0.100) |
| detect_echoA | flag with status of first echo detection |
| detect_echoB | flag with status of second echo detection |
| track.AvePosA | variable with exponential average of the first echo time delay index |
| track.AvePosB | variable with exponential average of the second echo time delay index |
| tmean[40] | array with the arithmetic averaged amt.ametric[] |
| npipe | variable with offset to use to pipeline incoming channel data going to the feo[] subroutine to align time delays in amt.ametric[] array |

4. DETECT STRONG ECHO:

1st Echo:

(ametric[max_hisA[0]]>=Thr_Coh) AND (ametric[max_hisA[0]] is a peak)

OR (ametric[max_hisA[1]]>=Thr_Coh) AND (ametric[max_hisA[1]] is a peak)

2nd Echo:

(ametric[max_hisB[0]]>=Thr_Coh) AND (ametric[max_hisB[0]] is a peak)

OR (ametric[max_hisB[1]]>=Thr_Coh) AND (ametric[max_hisB[1]] is a peak)

5. DETECT WEAK ECHO:
1st ECHO:
i) (max_hisA[0]==max_amt[0]) AND (max_hisA[1]==max_amt[1]) AND
(histoA[max_hisA[0]]>0.80*Thr_His*ncoh) AND (ametric[max_amt[0]]>0.80*Thr_Coh)
ii) (max_hisA[0]==max_amt[0]) AND (histoA[max_hisA[0]]>2.*Thr_His*ncoh)
iii) (max_hisA[0]==max_amt[0]) AND (histoA[max_hisA[0]]>2.*histoA[max_hisA[1]])
iv) (max_hisA[0]==max_amt[0]) AND (hisA[max_hisA[0]]>Thr_His*ncoh) AND
(histoA[max_hisA[1]]>1.25*histoA[max_hisA[1]]) AND (ametric[max_amt[0]]>0.80*Thr_Coh)
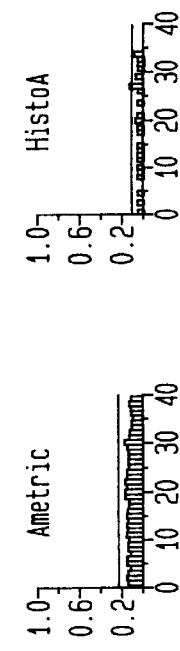
FIG. 12A

FIG. 12B

5. DETECT WEAK ECHO (CONT):

2nd ECHO:
  i) (detected 1st echo) AND
     (histoB[max_hisB[0]]>0.80*Thr_His*ncoh) AND (ametric[max_hisB[0]]>0.80*Thr_Coh)

ii) (detected 1st echo) AND (histoB[max_hisB[0]]>2.*Thr_His*ncoh)

iii) (detected 1st echo) AND (histoB[max_hisB[0]]>2.*histoB[max_hisB[1]])

iv) (detected 1st echo) AND (histoB[max_hisB[0]]>Thr_His*ncoh) AND
     (histoB[max_hisB[0]]>1.25*histoB[max_hisB[1]]) AND (ametric[max_hisB[0]]>0.80*Thr_Coh)

FIG. 14

7. TRACK ECHO:
   for each new ametric[]scan
       if no echo detected
           if track.TcountA>0
               ++track.McountA    /*increment miss count for 1st echo*/
               if track.McountA==MisCntA
                   reset tracker (1st and 2nd echo)
           if track.TcountB>0
               ++track.McountB    /*increment miss count for 2nd echo*/
               if track.McountB==MisCntB
                   reset 2nd echo
       if 1st echo detected
           if detected echo index within 1 bin of averaged index
               ++track.TcountA    /*increment hit count for 1st echo*/
               update averaged index for 1st echo
           else
               ++track.McountA
               if track.McountA==MisCntA
                   reset tracker (1st and 2nd echo)
       if 2nd echo detected
           if detected echo index within 1 bin of averaged index
               ++track.TcountB    /*increment hit count for 2nd echo*/
               update averaged index for 2nd echo
           else
               ++track.McountB
               if track.McountB==MisCntB
                   reset 2nd echo
   end for

B. DECIDE IF ECHO IS PRESENT:

```
if (track.TcountA>MinCntA)
   detect_echoA=1;
else
   detect_echoA=0;
if (track.TcountB>MinCntB)
   detect_echoB=1;
else
   detect_echoB=0;
```

- CLIP THREE CONSECUTIVE 10msec. FRAMES WHEN MEETING FOLLOWING TWO CONDITIONS:

$$\frac{TotPowIn[n-2]+TotPowIn[n-1]}{2*TotPowIn[n-3]} > 20$$

$$\frac{TotPowIn[n-2]+TotPowIn[n-1]}{2*TotPowIn[n]} > 3$$

FIG. 17A

| Input | Description |
|---|---|
| Npower | variable with the averaged noise power for the incoming channel |
| TotPowIn[indx3] | variable with the incoming channel power for the current processing frame |
| detect_echoA | flag from tracker indicating that echo is present in the incoming channel |
| vad[7] | circular array indicating whether incoming channel is speech or noise |
| lpc_ii[11] | array with lpc model of incoming channel |
| us_vad[50] | circular array indicating whether outgoing channel is speech or noise |
| lpc_us[50][11] | circular array with history of lpc models for outgoing channel |
| ii_vadout | flag indicating whether outgoing channel at current processing frame is speech or noise |
| ii_pow[3] | circular array with 20 msec averaged power of incoming channel |
| us_pow[3] | circular array with 20 msec averaged power of delayed outgoing channel |
| clip_echo | flag indicating if there is spectral matching between the incoming and outgoing channels |
| spec_match | variable with number of spectral peaks that match between the incoming and outgoing channels |

FIG. 17B

| Variable | Description |
|---|---|
| cep_dist | variable with cepstral distance between incoming and outgoing channels |
| clip_consec | variable with number of consecutive clipping frames |
| clip_crackle | flag indicating that crackle has been detected in the incoming channel |
| clip_echo_prev | variable with value of the previous frame clip echo flag |
| clip_transition | flag indicating a non-clipping frame after a series of clipping frames |
| dbt_flag | flag indicating a double-talk condition (both channels have been declared speech) |
| dbt_pow | variable with local maximum of ii_pow[0] when both channels have been declared speech |
| ech_frame | variable with last frame number classified as echo |
| ech_local | variable with maximum ii_pow[0] of consecutive clipping frames; resets to 0 when no clipping occurs |
| ech_local_prev | variable with value of the previous frame ech_local variable |
| ech_loss_avg | variable with the calculated average echo loss between the outgoing and incoming channels |
| ech_pow | variable with maximum ii_pow[0] when echo has been detected (across whole conversation) |
| ech_thr | variable with maximum of the lowest speech-only frame power and the echo_pow variable |
| nc_count | variable with number of consecutive speech frames with no clipping in the incoming channel |
| nc_frame | variable with the last speech frame number with no clipping in the incoming channel |
| prev_frame | variable with the number of the previous frame |
| spc_consec | variable with number of consecutive speech-only frames |
| spc_frame | variable with the number of the last speech-only frame |
| spc_init | flag indicating that the speech-only power have not been calculated yet |
| spc_local | variable with the short-term exponential power average of all incoming speech frames (spc_local=0.75*spc_local+0.25*ii_pow[0]) |
| spc_pow | variable with the long-term exponential power average of all speech-only frames (spc_pow=0.95*spc_pow+0.05*ii_pow[0]) |
| spc_start | flag indicating that the beginning of speech has been detected |
| s2e_high | flag indicating that the exponential averaged speech power is greater than the echo power |
| s2e_init | flag indicating that the exponential averaged speech power has been initialized |
| vad_ii | flag indicating if the incoming channel at current processing frame is speech or noise |
| vad_ii_prev | flag indicating if the incoming channel at previous processing frame is speech or noise |
| vad_us | flag indicating if the outgoing channel at the measured echo delay is speech or noise |

FIG. 18

$$cep\_dist = \sum_{n=1}^{L} (c_1[n] - c_2[n])^2$$

$$c_1(n) = -lpc[n] - \frac{1}{n}\sum_{k=1}^{n-1} k \cdot c_1[k] \cdot lpc[n-k]$$

$$c_2(n) = -lpc\_us[ntau] - \frac{1}{n}\sum_{k=1}^{n-1} k \cdot c_2[k] \cdot lpc\_us[ntau-k]$$

FIG. 19A

```
if(detect_echoA==1)
 if(vad_ji==1)
 {
 if(vad_us==1)
 if(clip_echo=1)
 {
 if(spc_init==0)
```

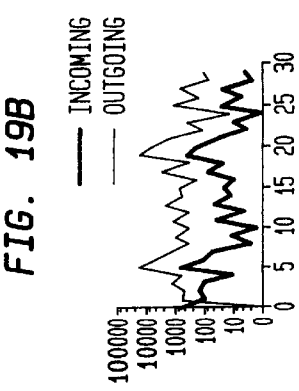

```
if( ((dbt_pow<=spc_pow) AND (cep_dst<2.4) AND ((prev_frame!=spc_frame) OR (spc_consec<3) OR
        (ii_pow[0]<min(min(ech_pow,spc_pow),6*ech_loss_avg*us_pow[0])))
    OR
    ((prev_frame==ech_frame) AND (ii_pow[0]<ech_thr))
    OR
    ((spec_match>2) AND (cep_dist<2) AND (ii_pow[0]<min(ech_pow,spc_pow)) AND
                                        (spc_local<ech_pow) AND (dbt_flag==0)))
    AND
    (ii_pow[0]<10.*ech_loss_avg*us_pow[0]))
{
  clip_echo=1;
}
``` else/*spc_init==1*/

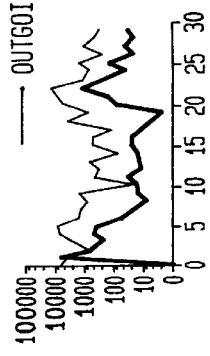

```
if(( ((dbt_pow<=us_pow[0]) AND (cep_dist<=1.5))
    OR
    ((prev_frame==ech_frame) AND (ii_pow[0]<ech_thr))
    OR
    ((spec_match>2) AND (cep_dist<2.) AND (ii_pow[0]<us_pow[0]) AND
                                        (spc_local<ech_pow) AND (dbt_flag==0)))
{
  clip_echo=1;
}
```

FIG. 19B — INCOMING / OUTGOING

FIG. 19C — INCOMING / OUTGOING

FIG. 20

```
else/*clip_echo==0*/
{
    if((prev_frame==ech_frame)
        AND
        (ii_pow[0]<min(ech_thr, 6.*ech_loss_avg*us_pow[0]))
        AND
        ((vad_ii_prev==1) AND ((s2e_init==1))) OR (s2e_high==1))))
    {
        clip_echo=1;
    }                                                              3
    else/*vad_us==0*/
    {
        if((prev_frame==ech_frame)
            AND
            (ii_pow[0]<min(ech_thr, 6*ech_loss_avg*us_pow[0]))
            AND
            ((vad_ii_prev==1) AND (s2e_init==1) OR (s2e_high==1))))
        {
            clip_echo=1;
        }                                                          4
        else/*vad_ii==0*/
        {
            if(((prev_frame==ech_frame) AND ((ii_pow[0]<ech_local)
                OR
                (vad_us==1) AND (ii_pow[0]<=6.*ech_loss_avg*us_pow[0])))
            {
                clip_echo=1;
            }                                                      5
        }
    }
}
```

FIG. 21

[6]
```
if ((clip_transition==1))
{
    if ((clip_echo==1)
        OR
        ((vad_us==1) AND (vad_ii==0))
        OR
        ((spc_start==0) AND
        ((s2e_high==1) OR (u_vadout==1)) AND
        ((ii_pow[0] <min(min(1.25*Npower,6.*ech_loss_avg*us_pow[0]),ech_local_prev)) OR (TotPowIn[indx3] <1.25*Npower))))
    {
        clip_echo=1;
    }
}
```

[7]
```
if ((clip_echo_prev==1) AND (clip_echo==0))
{
    if ((clip_crackle==1)
        OR
        ((vad_us==1) AND (vad_ii==0))
        OR
        ((spc_start==0) AND
        ((s2e_high==1) OR (u_vadout==1)) AND
        ((ii_pow[0] <min(min(1.25*Npower,6.*ech_loss_avg*us_pow[0]),ech_local)) OR (TotPowIn[indx3] <1.25*Npower))))
    {
        clip_echo=1;
    }
}
```

FIG. 22

```
if(clip_echo==1)
{
    if(((ech_loss_avg>0.) AND (TotPowIn[indx3]>1.25*Npower))              ⑧
        AND
        (((ii_pow[0]>24.*ech_loss_avg*us_pow[0] AND (ii_pow[1]>12.*ech_loss_avg*us_pow[1]) AND
         (ii_pow[2]>6.*ech_loss_avg*us_pow[2]) AND (ii_pow[0]>ii_pow[1]))
        OR
         ((ii_pow[0]>6.*ii_pow[1]) AND (ii_pow[1]>6.*ii_pow[2]) AND
         ((ii_pow[0]>100.*ech_loss_avg*us_pow[0]) OR (vad_us==0))))
    {
        clip_echo=0;
    }
}
if(vad_ji)                                                                 ⑨
{
    if((prev_frame-nc_frame)<16)
        AND
        ((ii_pow[0]>max(2.*ech_loss_avg*us_pow[0], Npower)) OR (spec_match<2.) OR (cep_dist>1.))
        AND
        (((Inc_count>2) AND (ii_pow[0]>xx_avg_prev))
        OR
         ((clip_echo_prev==1) AND (ii_pow[0]>ech_local))
        OR
         ((clip_echo_prev==0) AND (ii_pow[0]>ech_local_prev))))
    {
        clip_echo=0;
    }
}
else                                                                       ⑩
{
    if((clip_consec==0)
        AND
        (((prev_frame-nc_frame)<4) OR (vad_us==0))
        OR
         (((prev_frame-nc_frame)<8) AND ((spec_match, 1) OR (ii_pow[0]>max(3.*ech_loss_avg*us_pow[0].spc_local)))))
    {
        clip_echo=0;
    }
}
```

FIG. 24

| INPUT VARIABLE | DESCRIPTION |
|---|---|
| Ninit | flag indicating if the noise fill logic has initialized |
| tnr_stat | flag indicating if the tnr algorithm is enabled |
| toneLevel | variable with the measured tone level in the incoming channel |
| Thresh_tone | variable with the threshold for tone detection |
| Nfract | provisionable parameter with the noise attenuation for white noise |
| Nfract2 | provisionable parameter with the noise attenuation for total noise |
| Nperiod | variable with the measured period of the array noise buffer |
| Noise[512] | circular array with the incoming channel noise |
| OutPow | variable with the measured power of the previous frame |

FIG. 25A
1. Calculate the power spectrum of Noise []
2. if peaks (Noise [] power spectrum) <4e7  /*detect tones at -40 dBm*/
   Nperiod=800                              /*or louder           */
   else
       corr=maximum (autocorrelation (Noise, lag1, lag2, 160))
       if .75<corr<1.25
           Nperiod=index (maximum (autocorrelation (Noise, lag1, lag2, 160)))
       else
           Nperiod=800
       endif
   endif
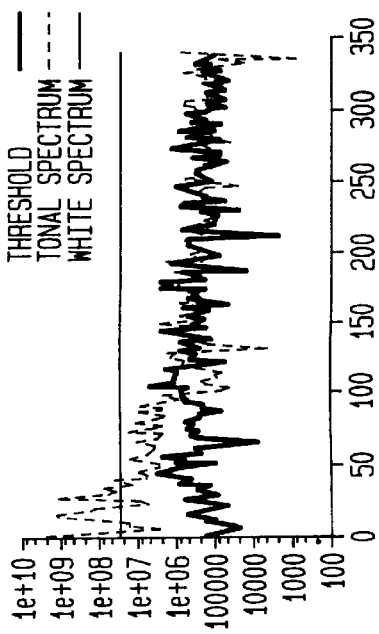
FIG. 25B
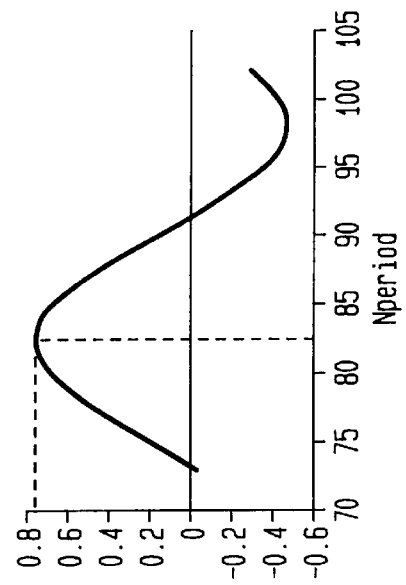
FIG. 25C

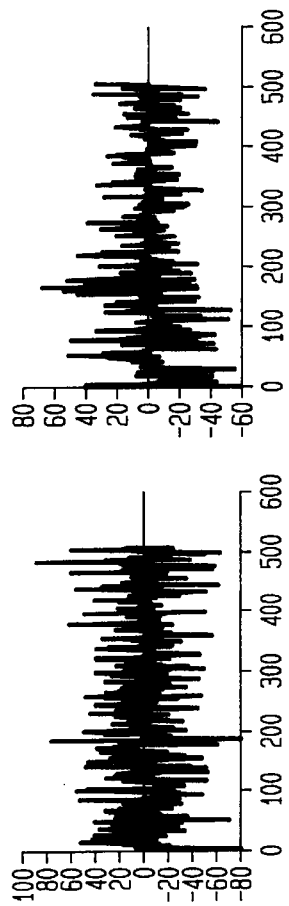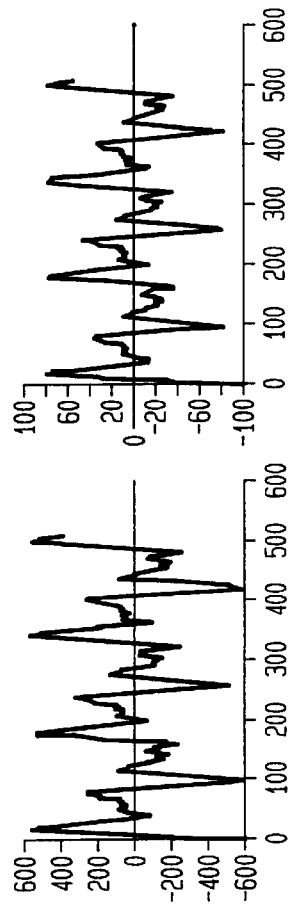

WEIGHTED SIGNAL LEVEL = (SIGNAL LEVEL OF t+4 FRAME)*10000
                     + (SIGNAL LEVEL OF t+2 FRAME)*1000
                     + (SIGNAL LEVEL OF t FRAME)*100
                     + (SIGNAL LEVEL OF t-2 FRAME)*10
                     + (SIGNAL LEVEL OF t-4 FRAME)*1

ECHO DETECTION, TRACKING, CANCELLATION AND NOISE FILL IN REAL TIME IN A COMMUNICATION SYSTEM

FIELD OF THE INVENTION

This invention relates to techniques for processing reflected speech signals in a communication system, commonly referred to as echo, and, more particularly, to the detection and tracking of echo during a call, the cancellation of the echo by clipping the returned echo from a received voice communication and the replacement of the clipped echo with noise samples such that the noise fill matches the noise present in the communications channel.

BACKGROUND OF THE INVENTION

In U.S. Pat. No. 5,587,998, a method and apparatus for reducing residual far-end echo in a voice communication network is described which introduces the concepts of implementing far-end echo control in a local network to improve the local talker's communication experience. The method involves measuring the delay between an originated voice signal and its reflected occurrence in order to predictably identify an echo, smoothing the prediction over time, and attenuating or canceling an echo that falls within defined range. FIGS. 1 and 2 of the '998 patent, also reproduced here as FIGS. 1 and 2, describe the voice communication network environment in which the present invention may be employed to advantage. FIGS. 3–6 provide an overview of an algorithm for reducing/canceling echo once detected. FIGS. 3–5 of the '998 patent are reproduced in this patent application. In the '998 patent, at column 8, line 43 through column 11, line 19, there is described an algorithm for detecting, tracking and smoothing an echo estimate over time in accordance with FIG. 6 of the '998 patent.

Echo, if it occurs sufficiently close to a local talker, is heard as a rain barrel effect. In very long distance communications over land lines, or in satellite communications when distances (and absolute path delays) are sufficiently great, the local talker hears the echo as a repeat of the originated speech, delayed by the path delay from the local talker to a reflection point (for example, the location of a hybrid or other impedance mismatch) and return. In a real-time voice communication network, the echo cannot be identified and handled off-line but must be identified and clipped immediately in real time. Consequently, it is necessary to implement an echo cancellation algorithm in such a manner that it can act on echo as soon as it is identified. Consequently, software designers must make choices in allocating tasks between those that must be performed in real time and those that can be performed at other times.

Once the tracking and clipping decisions are implemented, there can remain a discomforting dead period in the voice communication heard by the local talker. In other words, there can be a period of absolute silence to a local talker that signals that voice signal processing has occurred. Consequently, it is an object of the present invention to not only implement a tracker and clipper in real time but implement a noise fill algorithm which fills the dead period with noise similar to that already experienced by the local talker on the voice communications channel.

Furthermore, known echo cancellation methods and apparatus operate in such a manner as to create spikes of high noise energy that can be heard by a near end talker as "crackle," a noise characterized by a sound not unlike the crackling of a fire. It is our further objective to provide a tracking and clipping algorithm for echo removal that also accounts for such crackle and removes the crackle and a noise fill algorithm that preferably fills gaps of removed crackle with unobjectionable noise fill.

Thus, there remains in the art a need to implement an echo detecting, tracking, clipping and noise fill algorithm in real time which provides the local talker with a relatively quiet, echo-free voice communication channel between the far end talker and the local talker. If such a process is implemented at both ends of the communications channel, both talkers will experience an echo-free speech communication.

SUMMARY OF THE INVENTION

According to the algorithm of the present invention, there are provided two streams of input data: outbound near-end speech and inbound far-end speech, obtained from a given voice communication between a near-end talker and a far end talker. Voice activity detector circuitry detects speech as voice activity in each stream. When there is a high degree of coherence between the outgoing speech and the incoming speech and when the magnitude of the reflected speech is large enough in comparison with the outgoing speech, there is a likely incidence of audible, objectionable echo. Consequently, inputs to the tracker of the present algorithm are derived from obtaining an averaged magnitude coherence versus time delay between outgoing and incoming channels in processor memory. The present invention can be best described by dividing it into three functional portions. The three functional portions of the algorithm may be described as 1) echo detection and tracking, 2) clipping and 3) noise fill. In regard to the detecting and tracking function, the location of the echo is determined by a delay calculation methodology which finds the maximum of the average magnitude of coherence as a function of time delay between outgoing and incoming channels. A tracker algorithm portion is used to assure that the estimate of the echo location is relatively consistent and not subject to spurious estimates and outliers. The second function is clipping. The clipper determines when to clip the inbound far-end signal after the detector/tracker has determined that echo exists in the conversation. The third function is noise fill and is responsible for generating and replacing noise samples once the detecting/tracking and clipping functions have determined that the current incoming signal is to be clipped because of the presence of echo. These functionalities (detecting/tracking, clipping and noise fill) of the algorithm are most conveniently implemented in a software and firmware design assuring its operation in real time. In this design, real time performance is assured by maintaining the speech samples and other data in circular buffers and by the arrangement of a main and subordinate functional programs in a modular structure.

In principle, over time, the incidence of echo from the same points of reflection should be consistent. Thus, the measured delays between the local talker and the reflection points are predictable and so the round-trip delay as well. Outgoing voice segments and incoming voice segments are confined to the relatively narrow range of frequencies that comprises the voice, telephone bandwidth. This frequency range is defined differently by those in the field but roughly comprises the range of frequencies between 300 Hz and 3000 Hz. Thus, while the magnitude of the reflection loss may vary slightly with voice frequency, there should be a predictable round-trip delay. Also, the round-trip transmission loss is equally predictable. Collected data for the near-end signal is correlated with far-end signal data and various tests are applied to historical data to predict the occurrence of strong and weak echo. This process is referred to herein as echo detection and tracking. Moreover, according to the invention, attenuated samples of the originated or outgoing speech are removed or clipped from the return or incoming speech path before the reflected speech reaches the near-end talker after an anticipated delay has passed and at a predicted power level. Additionally, according to the present invention, a noise segment of the incoming speech path is estimated, determined to be tonal or white noise, and is replicated according to the determination. The replicated noise is employed to fill the duration of the removed echo signal including any crackle, a further undesirable noise effect often experienced in echo cancellation.

The operations of the detecting and tracking, clipping, and crackle removal and noise fill algorithms may still leave a residual echo effect uncorrected. A residual echo clipper removes residual echo which is generally low energy, bursty and short in duration. For such residual echo which further tends to be discontinuous and sporadic, an echo window is derived from the referenced power level (near end transmit path), the measured echo delay, the near end voice activity detector and the echo loss level. The echo window provides a measure in time interval for the algorithm to localize the residual echo and actuate the clipper to clip the residual echo energy at a predetermined threshold.

Other advantages and features of the present invention will be understood from studying FIGS. 6–27 and the detailed description of a preferred embodiment.

BRIEF DESCRIPTION OF THE DRAWINGS

FIG. 9 provides an exemplary table of variables for tracking echo over time in a communications channel used for speech.

FIGS. 10–15 provide details of the eight steps of the tracker algorithm portion of the present invention; the first three steps are shown in FIG. 10 all relating to how to process the raw coherence measurements between the outgoing and incoming channels; step 4 is shown in FIG. 11 and relates to strong echo detection; step 5 is shown in FIGS. 12a and 12b and relates to weak echo detection; step 6 is shown in FIG. 13 and relates to smoothing the echo delay estimates over time; step 7 is shown in FIG. 14 and relates to tracking the echo over multiple scans (frames) of the voice communication; and step 8 is shown in FIG. 15 and elates to determining if echo is present.

FIG. 16a depicts an array for storing a history of speech frame power; FIG. 16b provides the formula of the tracker clipper for clipping highly non-linear echo that has been identified as crackle using the array developed from FIG. 16a; and FIG. 16c shows an example of the present algorithm where non-linear echo has been detected and replaced with noise restoration.

FIG. 17a provides an exemplary table of the inputs required for the tracker/clipper algorithm portion and FIG. 17b provides an exemplary table of the variables for the tracker/clipper portion;

FIG. 18 provides formula for the calculation of cepstral distance—a metric representing the spectral distance from the local talker to a reflection point and return;

FIG. 19 provides tracker/clipper algorithms for echo removal by spectral matching;

FIG. 20 provides tracker/clipper algorithms for echo removal without spectral matching;

FIG. 21 shows additional clipping conditions and FIG. 22 when clipping is disabled.

FIG. 23 shows an example of the output of the present algorithm where echo is detected, tracked, clipped and replaced with noise determined and filled via the noise fill algorithm of the present invention.

FIG. 24 provides a table of the inputs for a noise fill algorithm for filling canceled echo periods with noise;

FIGS. 25 and 26 provide details of the noise fill algorithm where the first step is to characterize the noise, for example, as tonal noise or white noise where FIG. 25 relates to noise characterization and FIG. 26 relates to filling a period with the noise characterized by the noise characterization step; FIG. 25a provides the noise characterization algorithm details, FIG. 25b a noise power spectrum comparison for tonal noise and white noise and a threshold level, and FIG. 25c provides a noise autocorrelation (for tonal noise); FIG. 26a provides noise fill algorithm details, FIG. 26b provides a Noise[ ] array buffer plot and FIG. 26c a generated noise fill buffer plot for a white noise fill example and FIG. 26d provides a Noise[ ] array buffer plot and FIG. 26e a generated noise fill buffer plot for a tonal noise fill example.

FIG. 27 provides an overview of the present echo detector/tracker, echo clipper and noise filler and a further feature, namely, residual echo clipping in the context of an overall noise reduction and echo removal process including echo detection and tracking, clipping, and noise fill.

DETAILED DESCRIPTION OF A PREFERRED EMBODIMENT

Figure 1:
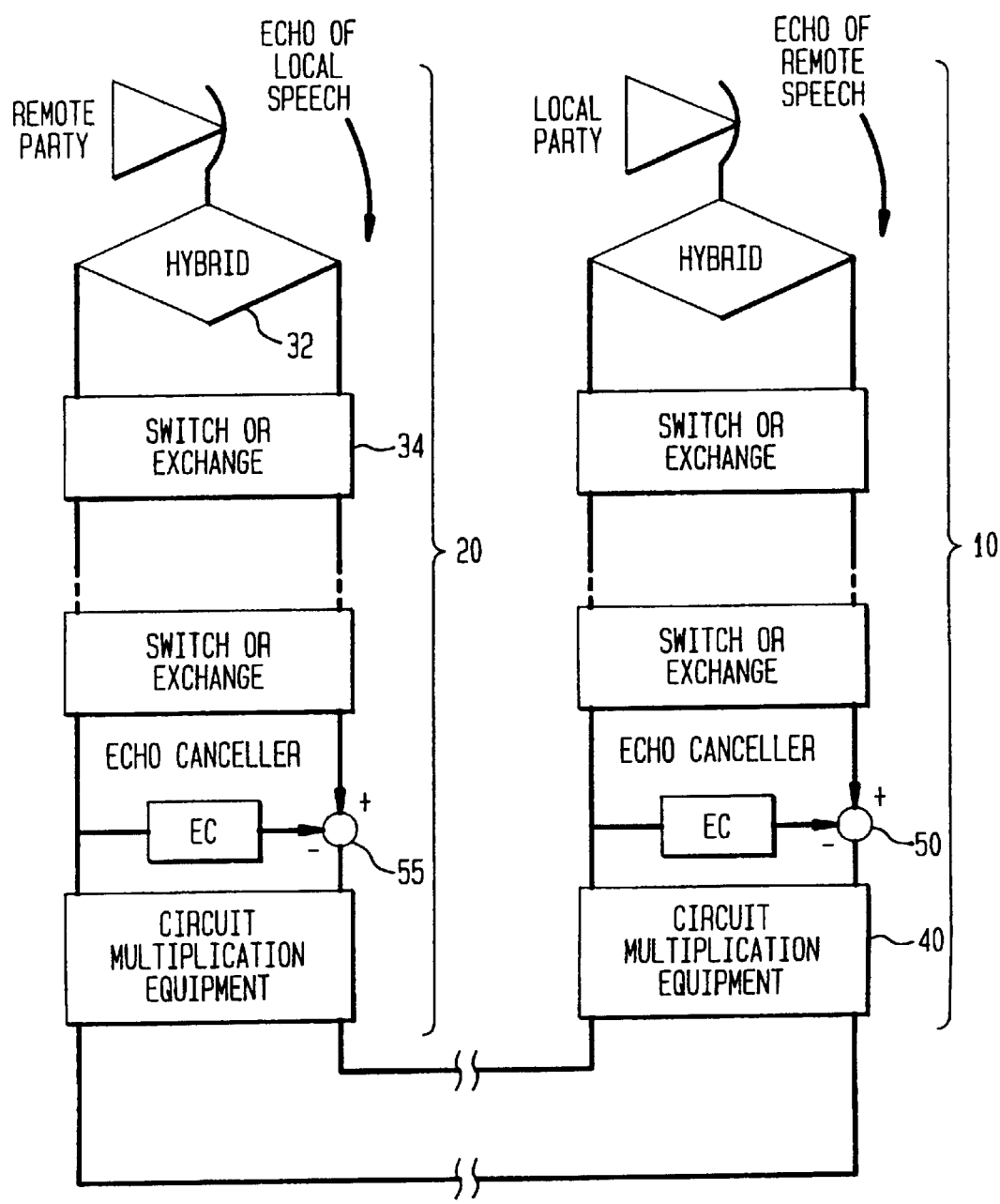
FIGS. 1–5 are taken from U.S. Pat. No. 5,587,998 of Patrick M. Velardo, Jr. and Woodson D. Wynn, incorporated as to its entire contents by reference.
Figure 2:
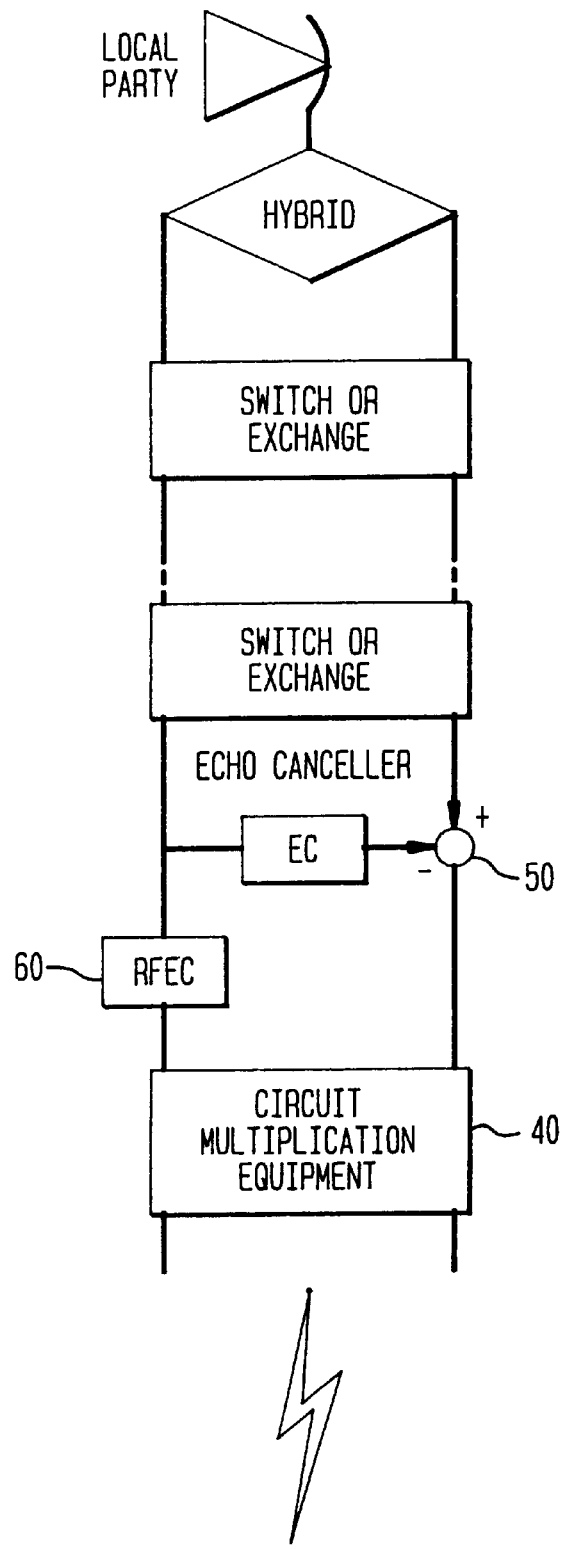
Figure 3:
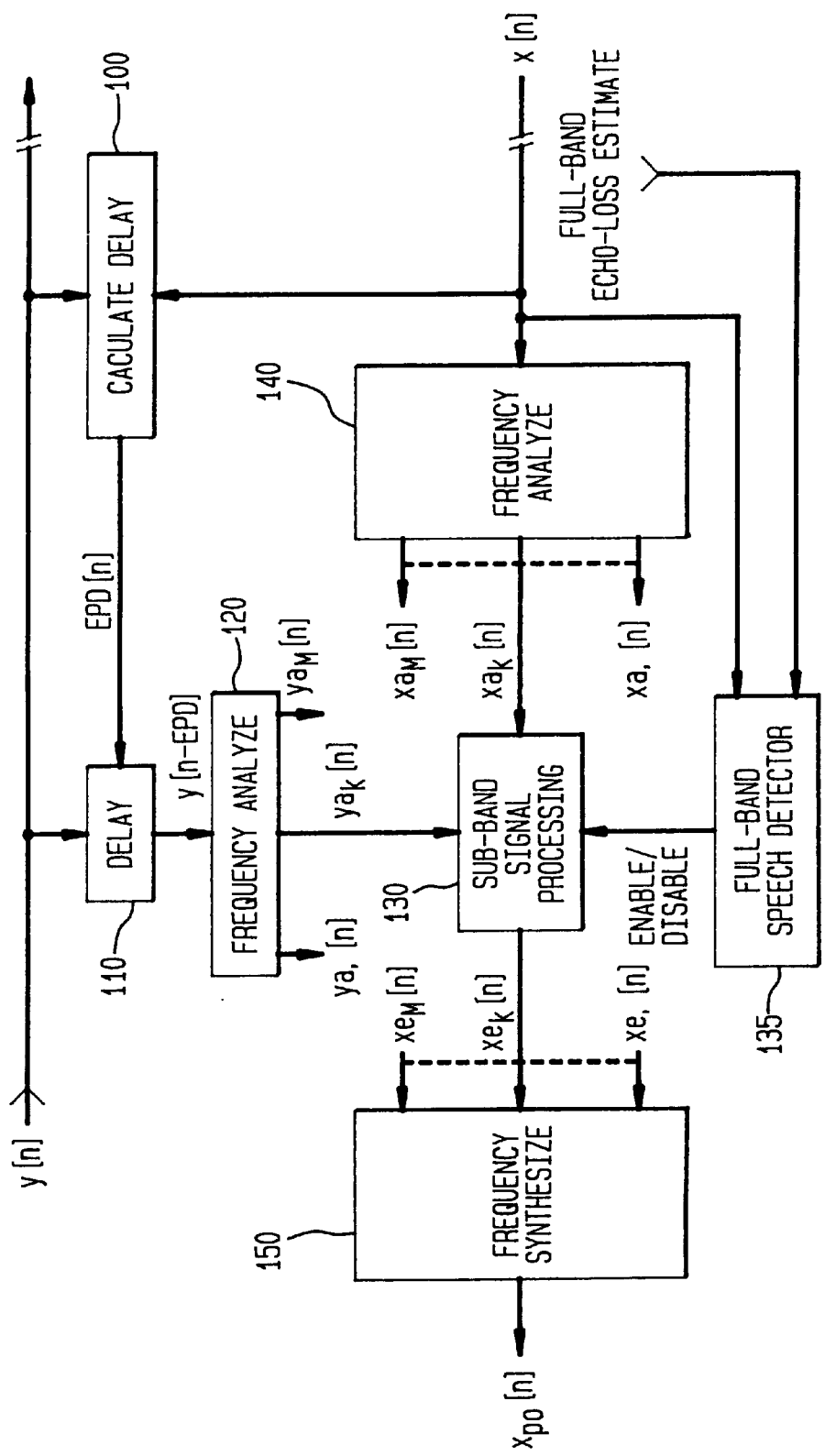
Figure 4:
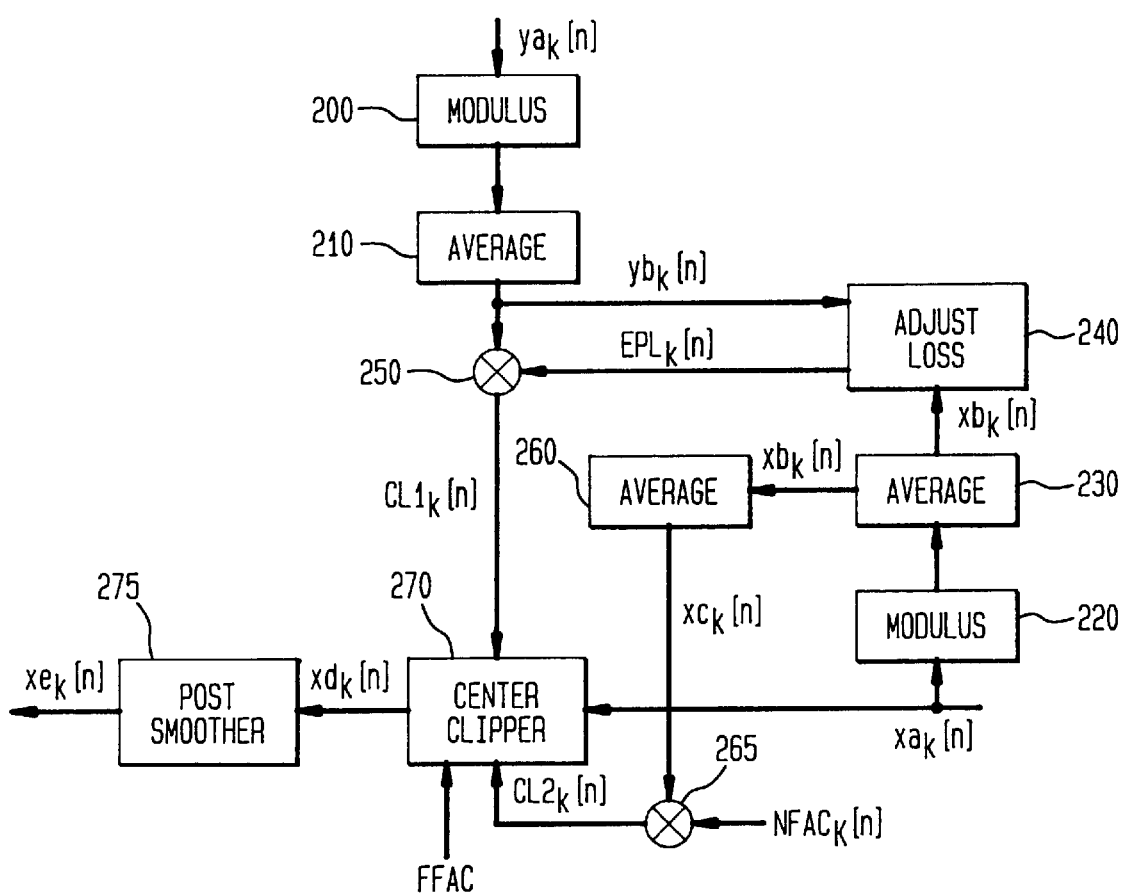
Figure 5:
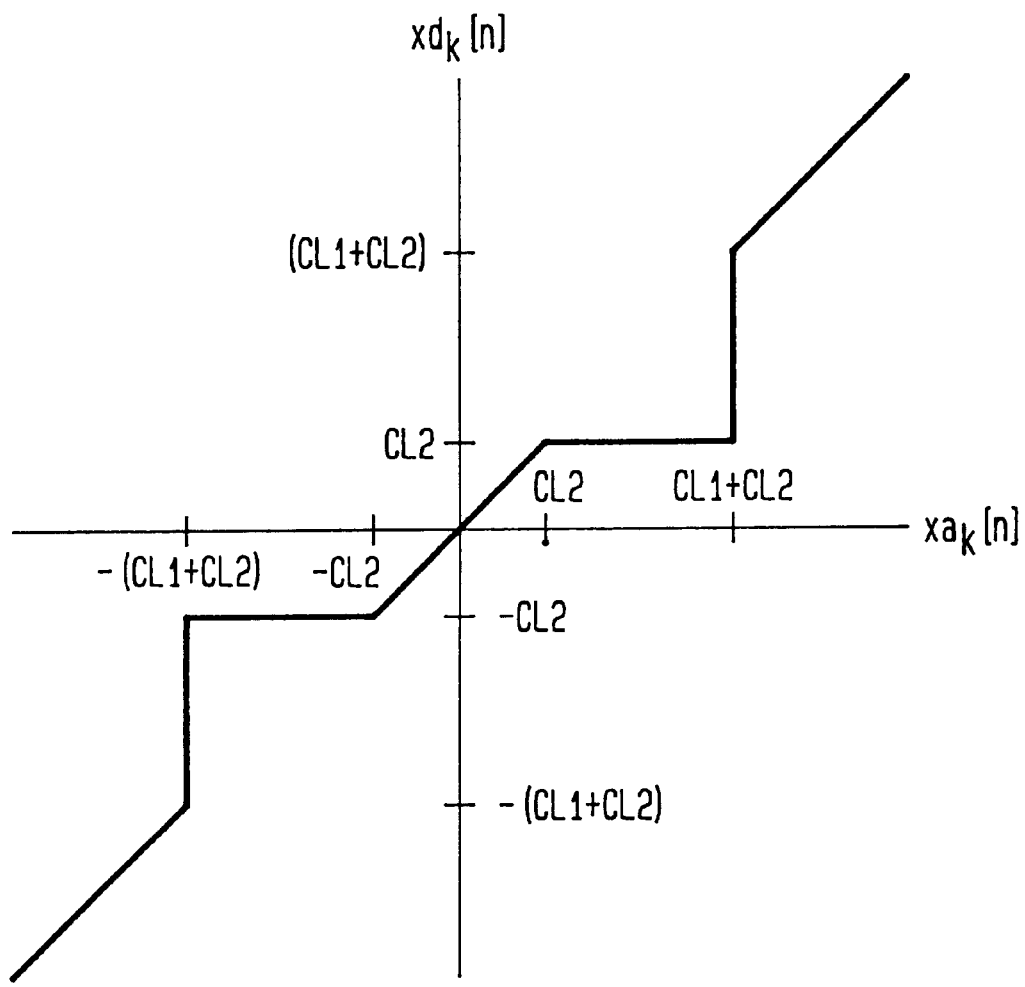

The communications network of prior art FIGS. 1 or 2 is shown comprising a local network 10 and a remote network 20 which are not to be confused with telecommunications terms such as local exchange carrier (LEC) or toll network and the like. The present invention and that described by the '998 patent are most conveniently implemented as close to the local party or local caller of local network 10 as possible so as to be able to correct for echo occurring anywhere beyond the residual far-end echo control (RFEC) invention 60 (FIG. 2) in the direction of the remote party (FIG. 1). Consequently, a private network operator, a LEC, such as a regional Bell operating company, or a toll network provider, such as AT&T Corporation, may use the present invention to advantage by utilizing the invention privately or offering the method and/or apparatus of the present invention for sale or lease or as a service offering to a service subscriber as an additional feature. The present invention is especially useful to a user who frequently makes toll calls into remote networks which have poor transmission facilities including impedance mismatching instances which cause reflection and echo. For example, the service of the present invention may be of great value to customers making frequent calls to remote locations which have made little or no investment in transmission enhancement. In summary then, by "local talker" is meant a person originating speech who would subscribe to, purchase or otherwise obtain the service provided by the present invention. Moreover, the present invention may be most conveniently utilized at a location close to the local talker.

Referring to FIG. 2, it may be assumed that the invention may be used anywhere in a four wire or two directional channel where the paths of communication are separated. This may in fact occur, for example, even at the location of the customer, such as at a private branch exchange (PBX) having four wire or carrier PBX trunking facilities where transmission paths are separated. Other terms are used herein consistent with the same terms used in the '998 patent.

Typically, the causes of reflection and echo in a private non-switched or public switched telecommunications network are impedance mismatches suffered, for example, at hybrid networks, only two instances of which are shown in FIGS. 1 and 2, used to convert from two wire (both transmission directions simultaneously in the two wire portion) to four wire or equivalent four wire (separate transmission paths, local to remote and remote to local, in a four wire or equivalent four wire portion). Less obtrusive impedance mismatches are known throughout the network but perhaps the most notorious of these is the hybrid. These include but are not limited to switch and voice amplifier locations in the local and toll network portions of an end-to-end link and locations of copper pair gauge changes, load coils, bridge taps and the like in a local subscriber loop. All of these may cause reflections and echo that may be corrected by the REFC 60 of the present invention.

Figure 6A:
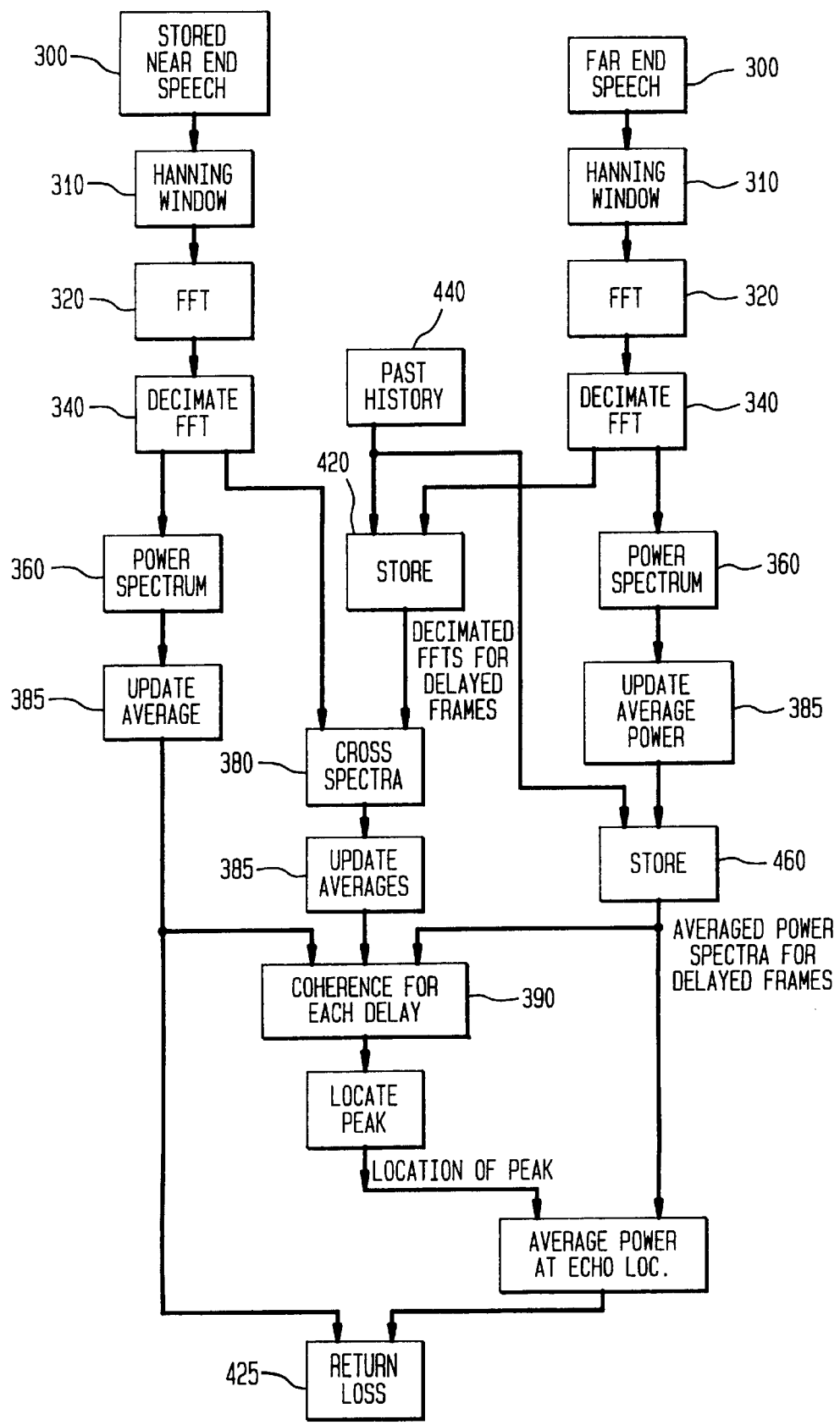
FIG. 6A is a functional flow diagram for calculation of coherence between near end speech and a far end returned signal.
Figure 6B:
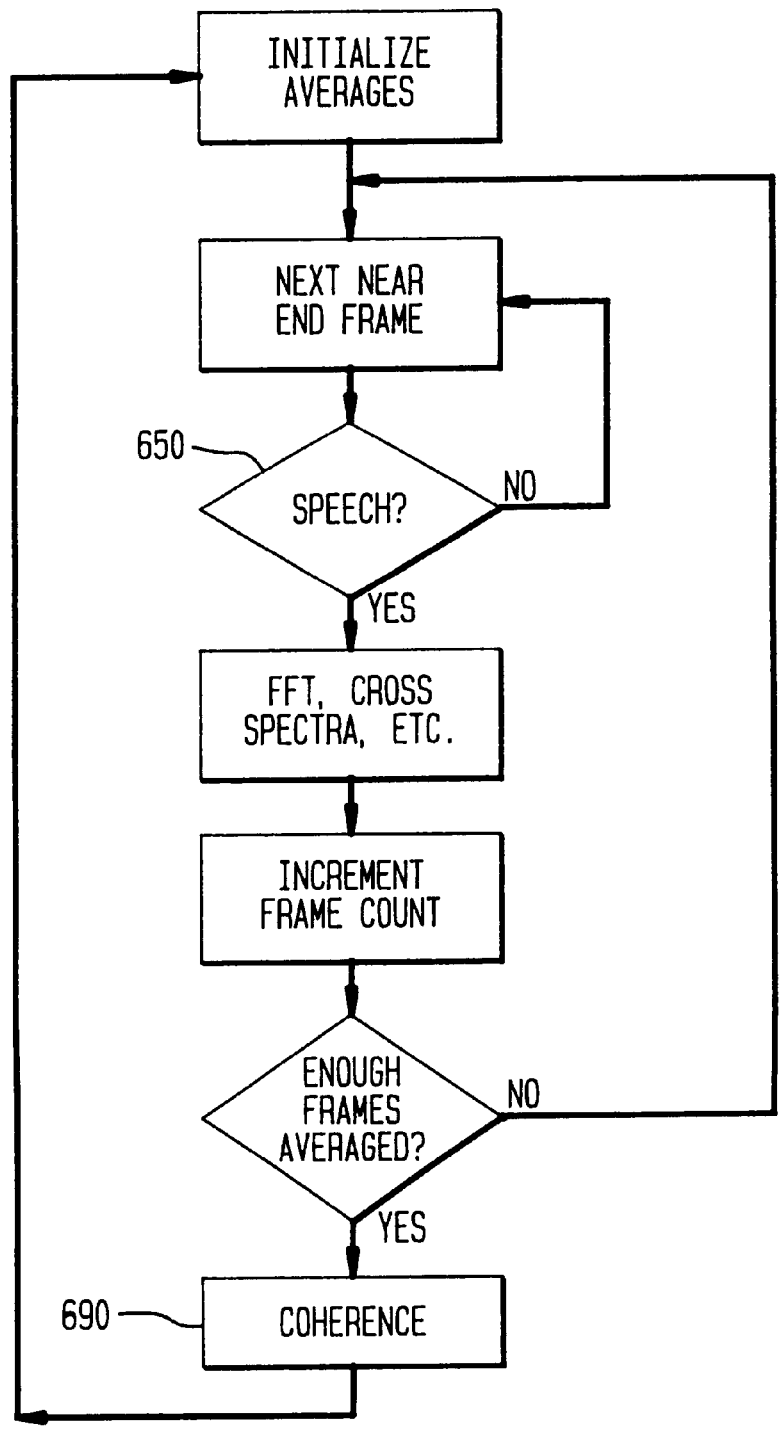
FIG. 6B is a functional flow diagram for the repetitive nested loops for coherence computation.

In the drawings, FIG. 6 provides details of the steps of obtaining raw coherence measurements. In particular, FIG. 6A provides a functional flow chart for coherence calculation between near end speech and far end returned signals including speech; FIG. 6B provides the internal algorithm loops for coherence computation. Referring to FIG. 6A, boxes 300, 440 represent the accumulation of a memory store of data over time for a given communications link established between a local talker (near end speech) and a remote party (far end speech) and echo from the far end of the near end speech; (far end speech plus echo of near end speech represent a combined far end signal). Box 300 represents the storage in buffer memory of the local talker's past frame corresponding to the greatest delay of interest and the storage in buffer memory of the current signal received from the far end. The first steps of the delay estimation algorithm are applying a Hanning window to the frame at box 310, taking the Fast Fourier Transform (FFT) of the frame at box 320, decimation of the FFT at box 340 and computation of the power spectrum at box 360. These computations are performed for each new near end frame and each new far end frame. FIG. 6A shows these computations for the current far end frame and the past near end frame corresponding to the longest delay to be tested (for example, 980 ms). The cross spectra are then obtained (box 380) for the past near end frame versus each delayed far end frame. This process is performed repetitively, with averaging of the power spectrum done at each iteration, over a predetermined number of near end frames (for example, twenty-five). The flow of control for this process is shown in FIG. 6B. When the averaging of the power spectrum has been updated for this sufficient number of frames per boxes 385, a coherence estimate is then computed at box 390 and the process begins over again. Further details of FIG. 6 will be described in connection with the discussion of FIG. 8. In this manner and in real time, the coherence computation results in predictions for echo path delay and echo return loss.

Figure 7A:
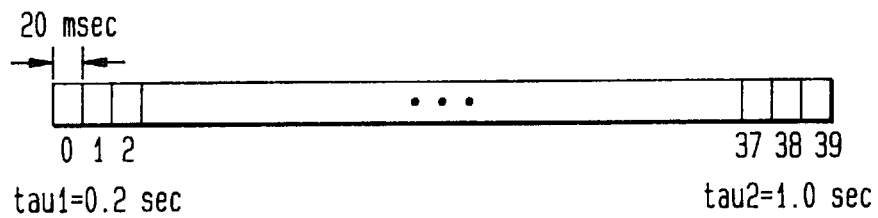
FIG. 7a provides a bar graph of exemplary raw coherence estimates versus time delay between outgoing and incoming channels.

Now according to the present invention, the echo detection and tracking functions will be further described in relation to one embodiment of the present invention described by FIGS. 6–15. Referring first to FIG. 7, there are provided exemplary inputs, in particular, an amt.ametric[ ] array comprising averaged magnitude coherence versus time delay between outgoing (toward remote party) and incoming (back to local talker) channels of a telecommunications link (preferably a long haul or toll link to a distant remote party where the round trip delay is significant). The segmented communications path is, for example, divided into 20 millisecond increments, 40 increments forming a segment having a total duration of approximately 1 second of speech background. A typical sampling rate is 8000 samples/sec.

Figure 8A:
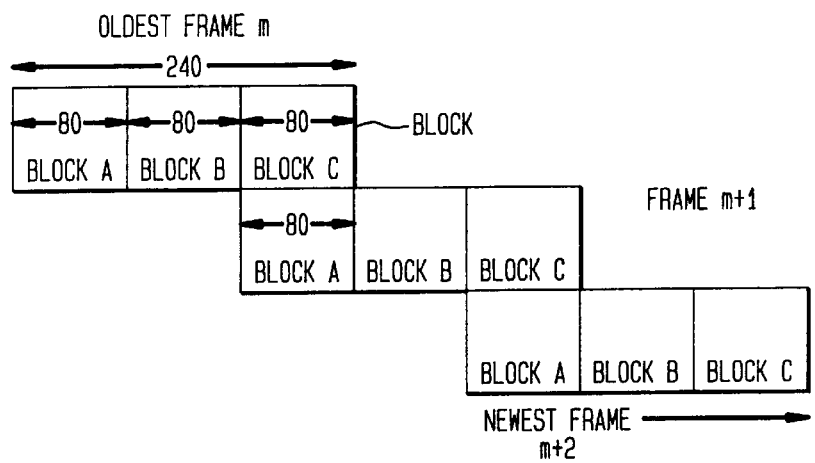
FIG. 8a shows details of frame and block storage via a circular buffer which permits echo detection and tracking to occur in real time.

Referring briefly to FIG. 8a, a preferred way of organizing incoming and outgoing signal data streams is in the manner of overlapping frames comprising three blocks of eighty samples each or 240 samples in total. Three such frames are shown having a single overlapping block of samples where the oldest frame is at upper left and the newest frame is at lower right.

The software design preferably employs a top-down structure where the main routine is short and simple for ease of integration. Also, the module structure preferably separates machine-dependent assembly language code from C language code or other higher level language code. The delay calculation software determines that value of delay which maximizes the coherence for the far-end speech and near-end speech. It then decides whether the far-end speech at that point is an echo of the near-end speech. The tracker module provides smoothing of the delay estimates in the course of a call in order to avoid spurious estimates such as outliers (poor estimates lying outside a region of anticipation).

In keeping with conventional software design practice, header files and conditional compilation flags may be preferably used to keep track of system dependencies and each called function should perform a well-defined task or provide top-level control for a group of related tasks. All constants are preferably defined in a single header file so changes in values of constants are made in only one place.

The organization of the data into structures and buffers, the partitioning of the algorithm into modules and functions, and the flow of control are all preferably designed to present the problem structure with clarity. In the following paragraphs, these aspects of the invention will be discussed in detail. First, the buffering of speech data and computed data is described. Finally, the flow of control of the tracker algorithm is described.

Speech data and computed data are organized into buffers in a manner which reflects the structure of the data and the problem. In order to describe the buffering in the operation of the invention, it is helpful to define some terms. Let TREADY be the time interval at which each new block of speech arrives. Let BLKSZ be the number of samples in a block. The sampling rate may be referred to as SR. The name FRSZ may be the frame size, i.e., the number of samples in a frame. Preferred values for these values are TREADY=10 msec, BLKSZ=80, SR=8000 Hz and FRSZ =240. These values are suggested values for the variables presented; others may choose to vary from these predetermined suggested values in other implementations of the present invention.

Referring again to FIG. 8a, there is shown the overlapping frame processing preferred for application in the present invention. The algorithm has two input streams per FIG. 6A, the outbound or outgoing speech signal and the incoming or inbound speech signal from the remote location, such as a foreign country. The incoming streams are each divided into blocks which arrive at regular time intervals. For example, the program receives a block of size BLKSZ (for example, 80 samples) of near-end samples and a block of far-end samples. (If the sampling rate SR is 8000 samples per second, then each block comprises 80 samples in the described embodiment). The incoming signal is processed in frames of sample size FRSZ (for example, 240 samples or three 80 sample blocks) where a frame comprises three blocks consisting of a most recent block, for convenience referred to as Block C of a frame and two previous blocks, (a Block B and a Block A) of frame m, m+1 or m+2. The oldest block of a frame, a Block A, overlaps with (and is the same as) the newest block of the preceding frame, a Block C. For example, the third block, Block C, of oldest frame m overlaps with the first block, Block A of frame m+1. Block C of frame m and Block A of frame m+1 and corresponding blocks of frames, m+1 and m+2, are examples of blocks of 80 samples which overlap between adjacent frames.

Because of the overlap between frames, two blocks are obtained in order to have a new frame ready for processing. The new frame (for example, frame m+1) will contain one old block (for example, which is Block C of frame m or Block A of frame m+1) and two new blocks (Blocks B and C of frame m+1).

At the start of a call, the initial three blocks are obtained. After that time, whenever two new blocks have arrived, there is a new frame consisting of one old block and two new blocks. For convenience, the first of any new blocks will be called Block 1 and the second, Block 2. Any processing associated with a new frame is performed during every other block, for example, after Block 2 is obtained. Therefore, 80 ms of real time is the duration available for frame processing before the next Block 1 of the next frame, newest frame m+2, arrives. The speech processing modules were limited in operating time on the preferred speech processor of the described implementation even further, for example, to approximately 15% of this 80 milliseconds or to 12 milliseconds.

Because each new speech frame consists of three equal length blocks, with an overlap of one block between frames, two new blocks of speech are required to obtain a new speech frame. Rather than perform processing only after the second block is received (which would waste processing time occurring after the first block is available and before the second is available), the control structure of this invention divides the processing tasks into two functions: Process Block 1 (proc_block1) and Process Block 2 (proc_block2), so that some computation can be performed during each time interval between the arrivals of speech blocks. These two routines are described further below.

When Block 1 of a given frame is present and after it is processed and while Block 2 has not yet arrived, processing time is preferably not wasted. The algorithm preferably turns over processing to coherence computation and tracker functions. For example, if averaging has been performed over a sufficient number, for example, 25 of near-end frames containing speech, then during the next Block 1 interval, the coherence computations and tracker functions are executed. This repetitive process is depicted in FIG. 6B. If averaging has not taken place over a sufficient number of frames (for example, less than 25), then no other computation takes place during Block 1. The new samples obtained during Block 1 are saved for the Block 1 interval. As described, a "main() routine" is brief and provides a flow of control for obtaining the inputs and for alternating between Block 1 and Block 2 processing.

FIG. 8a may be regarded as a diagram of an input circular buffer. This is a buffer for newly arriving speech samples. Looking at the "oldest frame" then, Block A may be locations 0–79, Block B may be locations 80–159 and Block C may be locations 160–239 while locations 240–255 may be zero-padded of a 256 position circular buffer. Consequently, positions 0–239 form a circular buffer. The placement of oldest to newest samples alternate among three possible orderings as new blocks are obtained: Blocks A, B, C; Blocks C, A, B and Blocks B, C, A Both the near end and far end circular speech buffers may be similarly constructed and operate.

Figure 8B:
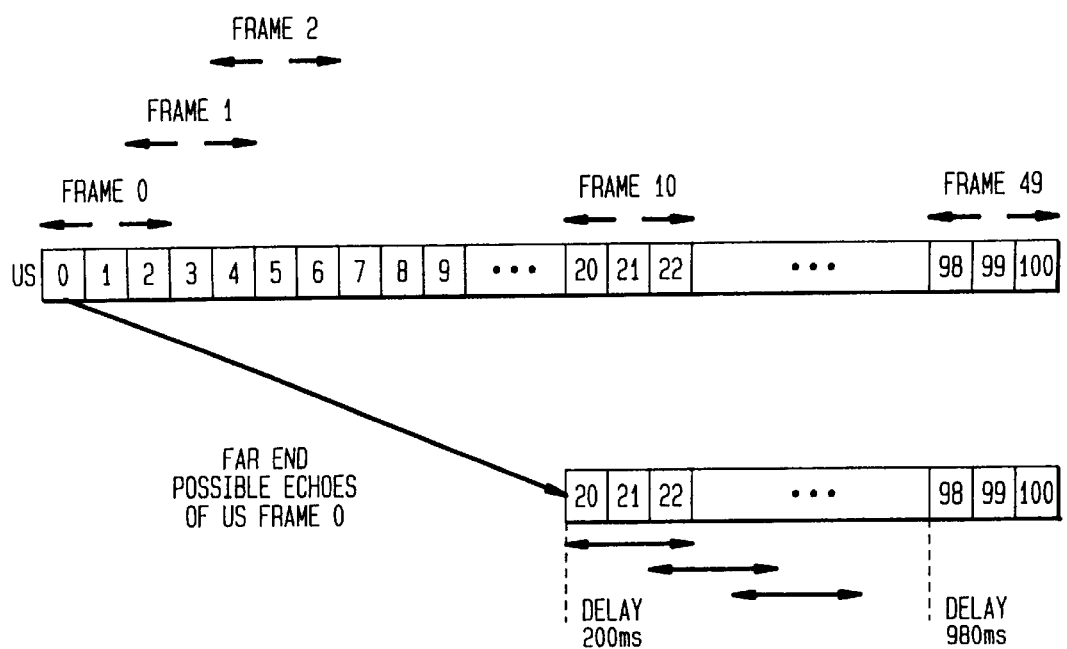
FIG. 8b shows a diagram of circular data buffering for the real time processing of FIG. 8a of near end and far end signals.

FIG. 8b is a diagram of the data buffering for the real time processing in the algorithm. Referring to FIGS. 8a and 8b, circular buffers are used for processing efficiency, so that, for example, one increments a pointer or index rather than copying large amounts of data.

The idea is to maintain a past history of the spectral data computed for outgoing signal frames so that the data can be compared (i.e. tested for coherence) with all possible incoming echo frames. A range of delay values is selected which comprises the range of delays at which one might expect to find echo. In telephony, the lowest amount of delay of interest, with respect to annoyance in conversation, could fall into the range of about 160 through 400 milliseconds. In the example shown in FIG. 8b, the value selected is 200 ms. In the actual system, this value is a variable parameter with a default (for example, 200 ms), and the parameter's value can be selected when the system is installed into a transmission facility. The idea is that in the actual system, if desired, the minimum delay of interest could be set differently at different locations, for example, if different facilities expect to receive signals arriving from particular transmission media or different areas of the world. The maximum possible delay of interest is usually in the range of 900 through 1200 msec, although in extreme cases delays of up to 2400 ms could occur. In the example in FIG. 8b, the maximum delay chosen is 980 ms.

In FIG. 8b, the top line represents near end processing and the bottom line represents far end processing. At the left of FIG. 8b are initial blocks (in this example, 20) occurring after the start of a call. The TEST FRAME is the past outgoing frame whose echo is being searched for. In this example, the TEST FRAME contains blocks 0 through 2 and is called Frame 0. The CURRENT OUTGOING FRAME is the newest frame for which spectral data has just been computed. In this example, the CURRENT OUTGOING FRAME is Frame 49. So as a new frame is received, the signal processor is detecting the echo of the frame which occurred NDELFRAMES ago, where NDELFRAMES is equal to CURRENT OUTGOING FRAME minus TEST FRAME, or, 49 in the example of FIG. 8*b*.

The idea is that at the start of a call, the data for the initial near end frames are saved, and the initial far end frames ignored, until there has been sufficient delay to start looking for echo. For example, FIG. 8*b* shows the initial twenty near end blocks, which form frames 0 through 9. Spectral data is saved for these frames. The corresponding initial incoming frames are not analyzed. As frames begin to arrive beginning with the MINIMUM EXPECTED DELAY, the data for both incoming and outgoing frames are saved. When the MAXIMUM EXPECTED DELAY is reached, initialization is over and the signal processor will start looking for the echo of the TEST FRAME. In the example of FIG. 8*b,* possible values within the ranges discussed above are a MINIMUM EXPECTED DELAY of 200 ms and a MAXIMUM EXPECTED DELAY of 980 ms. These delays should be considered as exemplary only and may vary over the ranges described above for telephony applications. In applications other than telephony, the ranges of delays could be different.

Let NFAR and NNEAR be the number of far end and near end frames for which data is stored, respectively. Let FIRST DELAY FRAME be the frame corresponding to the MINIMUM EXPECTED DELAY and CURRENT INCOMING FRAME be the frame corresponding to the MAXMUM EXPECTED DELAY (this is also the current incoming frame). The NFAR is equal to CURRENT INCOMING FRAME minus FIRST DELAY FRAME, plus one. NNEAR is calculated as CURRENT OUTGOING FRAME minus TEST FRAME, plus one. It is necessary to store data for NFAR frames of far end speech. For example, fifty frames of near end speech and forty frames of far end speech.

To meet the processing requirements for detecting echo, it is necessary to store data, for example, at RFEC 60 (FIG. 2), for NNEAR frames (total), for example, 50 of near-end speech frames and for NFAR frames, for example, 40 of far end speech.

The storage arrays for the data are preferably circular buffers so that whenever a new frame is ready, its associated data overwrites the oldest stored data in the buffer. Only one location has to be modified, and it is not necessary to move all the data backwards. As already indicated, a simple index or pointer is used for each of the near end and far end buffers to keep track of where the newest data should be written.

The following is a particular implementation of circular buffers used to store and organize data. First, some parameters will be introduced. Let NFAR and NNEAR be the number of far end and near end frames for which data is stored, respectively. As described above, preferred values for NFAR and NNEAR are NFAR=40 and NNEAR=50 as suggested already above. Then, there is a circular buffer for data related to far end speech and this buffer consists of NFAR structures, each for storing data for a far-end speech frame. The data in each structure consists of: 1) the decimated, band-limited samples of Fast Fourier Transform (FFT) processing, and 2) the power spectrum.

There is also preferably another circular buffer for data related to near-end speech. This buffer is an array of size NNEAR structures, each storing data computed for the outbound speech. The data in each (near end) structure consists of: 1) a flag telling whether or not the frame contains speech and 2) the decimated, band-limited samples of the Fast Fourier Transform.

In summary then, an input near-end circular buffer and an input far-end circular buffer form speech frames from the incoming blocks of speech samples and a far-end decimated set circular buffer and a near-end decimated set circular buffer are used to manage the storage of spectral information for past frames.

Non-circular buffers are also used in the present implementation. One such buffer stores near end speech blocks in consecutive order, since they are not necessarily consecutively arranged in the circular buffer. Another non-circular buffer stores data used for averaging. This is an array of NFAR structures, each structure containing data for a value of delay. Each such structure contains: 1) the average power and 2) the average cross power spectrum. The index into this delay value buffer is a function of the delay value for the data it contains.

Now a preferred partitioning of the tasks of the delay calculation and tracker algorithm portion will be described as a modular structure. In operation, the main() routine is the top level routine. It performs initialization and provides the high level control for directing the alternate processing associated with Block 1 and Block 2, as described briefly above. After processing a block, main() updates the values of all of the indexes to the circular buffers.

The next level of functions, those called by main(), are: 1) a routine to pre-compute the values of a Hanning window, 2) a routine to get a new block of samples, 3) a routine to do all of the processing tasks associated with Block 1 and 4) a routine which performs all of the processing associated with Block 2.

At the next level, there is a routine to organize the computations for a new outbound speech frame and another routine to organize the computations for the new inbound speech frame.

The lower level functions in this modular structure are preferably classified as follows. First, there are routines for getting new blocks of near end and far end samples. Second, there are routines to perform mathematical computations up to and excluding the estimation of coherence. There is a routine for each of the following: 1) pre-computing the Hanning window so that real time may be saved by the use of pre-computed values, 2) widowing a frame of data with a Hanning window, 3) the Fast Fourier Transform (FFT), 4) decimation and band limiting of the FFT, 5) computing the power spectrum 6) computing the cross spectrum, 7) updating the averages for outbound speech, 8) updating the averages for the inbound speech, 9) a function which estimates whether a frame contains speech, 10) a loop function which is called when the program is waiting until a new block of speech samples is available. In addition to these functions, there is a routine to compute the coherence and to call the tracker. Finally, there are the several routines associated with the tracker portion.

In order to achieve real time performance, several of the routines are implemented in assembly language. These may include: the FFT, the cross spectrum and the updating of the averages.

Now the preferred flow of control of the algorithm will be described in some detail. In aid of this discussion, some further parameters will be defined. Let ENDINIT1 and ENDINIT2 be frame counts used to determine the points in the program's execution at which the frame processing is to begin. Preferred values for these parameters are ENINITIL=22 and ENDINIT2=51.

In the preferred flow of control, the function which processes Block 2 is called by main(). It manages all of the mathematical computations up to and excluding the estimation of the coherence. It calls a routine to obtain and decimate the FFT for the new outbound frame. If the block count is ENDINIT1 or greater, it calls another routine to compute and decimate the FFT for the far-end frame. When the frame ENDINIT2 has been obtained, the current outbound frame can be compared with the delayed far-end frames. It calls the gating function to determine whether speech is present, and, if so, it updates the count of the number of frames averaged. It computes the power spectrum for the near-end and calls a routine to update the average power for this outbound speech. It calls the cross spectrum routine to compute the cross spectrum vector for the near-end frame with each delayed frame. It then calls the routine which updates the average power corresponding to the far-end frames.

The routine which processes a new outbound frame calls the functions to compute the windowing, the FFT and the decimation of the FFT. The routine which processes the new inbound frame calls the functions which perform windowing, the FFT, the decimation of FFT and the power spectrum computation.

The function which processes Block 1 is called by main(). If averaging has been done for a sufficient number of frames, then this routine will call a function to estimate the coherence corresponding to each value of delay. If the maximum value obtained exceeds a threshold, the delay corresponding to the maximum value of coherence is considered as a possible echo location. The delay value and the echo flag are written into variables which can be read by other parts of the program.

A principal question answered by the tracker algorithm is whether there is echo in the incoming channel from the outgoing channel. The tracker algorithm thus is responsible for monitoring raw coherence measurements between the incoming and outgoing channels to determine if echo exists throughout the conversation. The tracker algorithm begins anew on the next call to a different location over a different communications link.

Figure 7B:
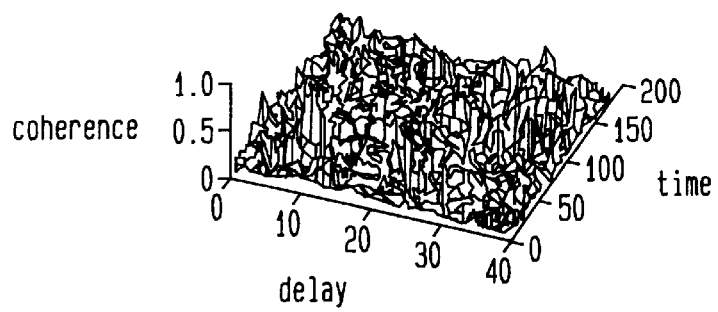
FIG. 7b shows an exemplary coherence plot for a voice communications channel and FIG. 7c provides a correlogram showing echo path delay over time, darkened portions being likely incidences of echo.
Figure 7C:
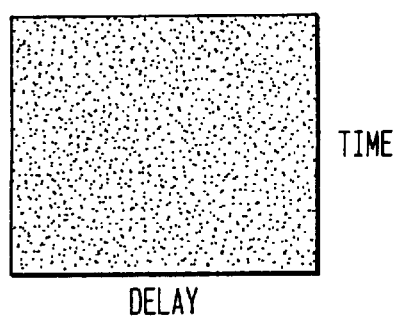
FIG. 7 provides an overview of the inputs for the detector/tracker of the present invention and how they are developed.

Referring to FIG. 7b, a coherence (scale levels 0, 0.5 and 1.0 shown vertically) versus delay (shown as values from 0 through 40 Tau or 800 milliseconds) versus time during a call (shown as scale values 0–200) plot is shown of far end with near end signals. Referring to FIG. 7c, a correlogram is provided showing round trip delay versus time during the same call experiencing a weak echo case. The darkened band regions of the correlogram show high correlations and incidences of weak echo.

FIG. 9 provides a table of exemplary variables used in the echo tracker algorithm. These include the ametric array of FIG. 7, histogram arrays and arrays of indices, time delay indices, flags, smoothed time delays for first and second echoes, exponential average constants and the like.

Figure 10:
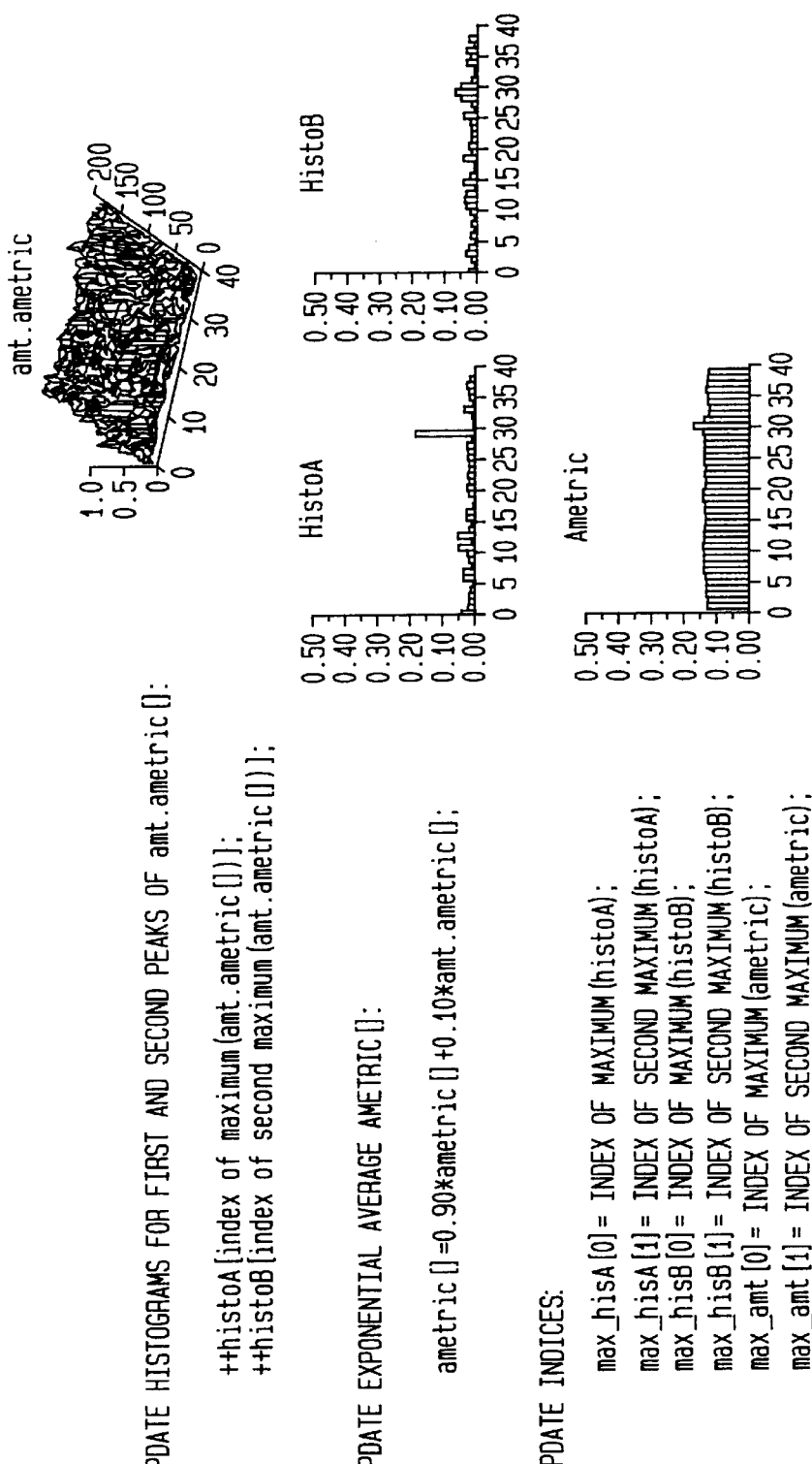

Now the heart of the eight step tracker algorithm will be described with reference to FIGS. 10–15. The first three steps are diagrammatically shown in FIG. 10. Referring to FIG. 10, the first step of the process is to update histograms for a first and second peaks of raw coherence measurements in amt.ametric[ ] (for echo incidences). To the right of the first step are provided histogram plots for exemplary first and second coherence peaks (histoA and histoB).

Step 2 of the algorithm is to update the exponential average ametric[ ]. One such function is shown as is an averaged ametric result to the right for the same plots histoA and histoB.

Step 3 relates to update the indices for each of histoA and histoB as well as the ametric.

Figure 11:
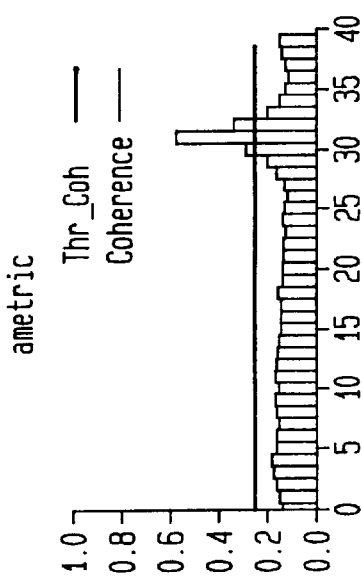

Referring to FIG. 11, step 4 the detection of a strong echo occurrence is shown. The condition for detecting the presence of a strong echo occurs when the averaged coherence (ametric[]) for a given delay exceeds a coherence threshold (Thr_Coh). In the ametric histogram example shown at the bottom of FIG. 11, this occurs at a delay (Tau) of 31 or 820 msec., since the maximum averaged coherence occurring at a delay represented by Tau of 31 exceeds the coherence threshold, for example, at 0.25.

Step 5, as illustrated in FIGS. 12a and 12b, relates to detecting a weak first and second echo in the incoming speech channel. A weak first echo is detected when any of four conditions are met as shown in FIG. 12a Each one of the four conditions i) to iv) examines the relationship between the averaged coherence versus the delay metric (ametric[]) and the histogram of the maximum peak of the raw coherence (histoA[]) versus the delay metric. If any of the four conditions are met, a weak first echo is detected and further testing is done for the presence of a weak second echo by meeting any of the four conditions shown in FIG. 12b. Each one of the four conditions for second weak echo detection examines the relationship between the averaged coherence versus time delay metric (ametric[]) and the histogram of the second highest peak of the raw coherence (histoB[]) versus the delay metric.

Figure 13:
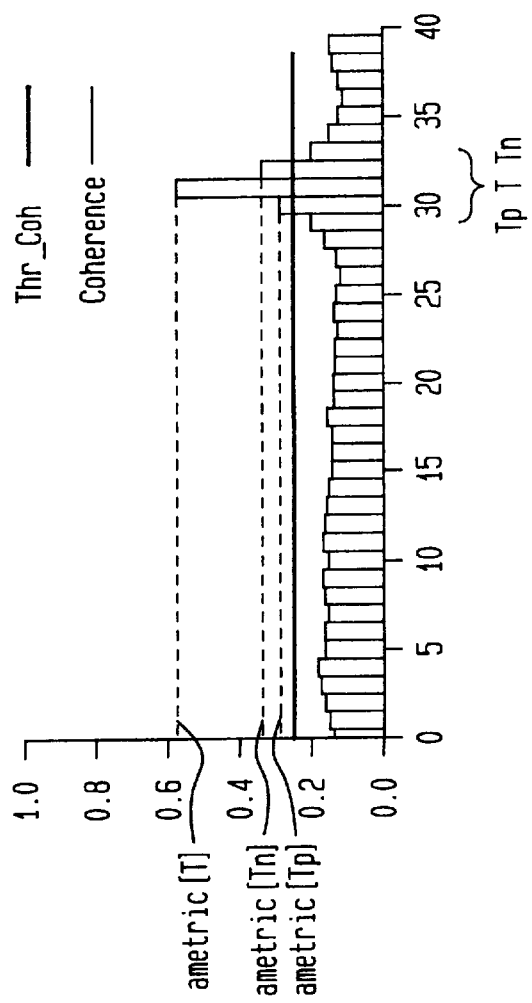

Step 6, shown in FIG. 13, relates to smoothing the time delay of the detected echo. A smoothing algorithm is shown along with an ametric plot in the region Tp to Tn (between 30 and 32).

Step 7, shown in FIG. 14, relates to echo tracking over time during a call for successive scans of raw coherence versus delay metric (amt.ametric[]). As shown, the tracking consists of accumulating counts of hits (echo detected) for the first and second echo.

Figures 15, 16A:
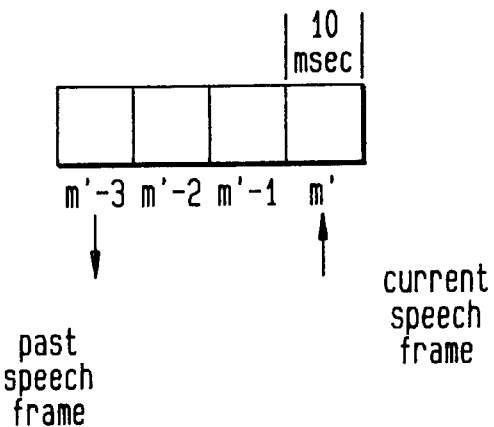

Finally, referring to FIG. 15, the algorithm for the eighth step of deciding if echo is present is shown. If the hit count for either the first or second echo (track. TcountA and trackTcountB) exceeds the hit count thresholds (MinCntA and MinCntB), then echo is flagged as present.

Now, the tracker clipper algorithm for echo removal will be discussed in some detail with reference to FIGS. 16–23. The tracker clipper can be divided into two parts, one for crackle removal and the other for echo removal.

Figures 16B, 16C:
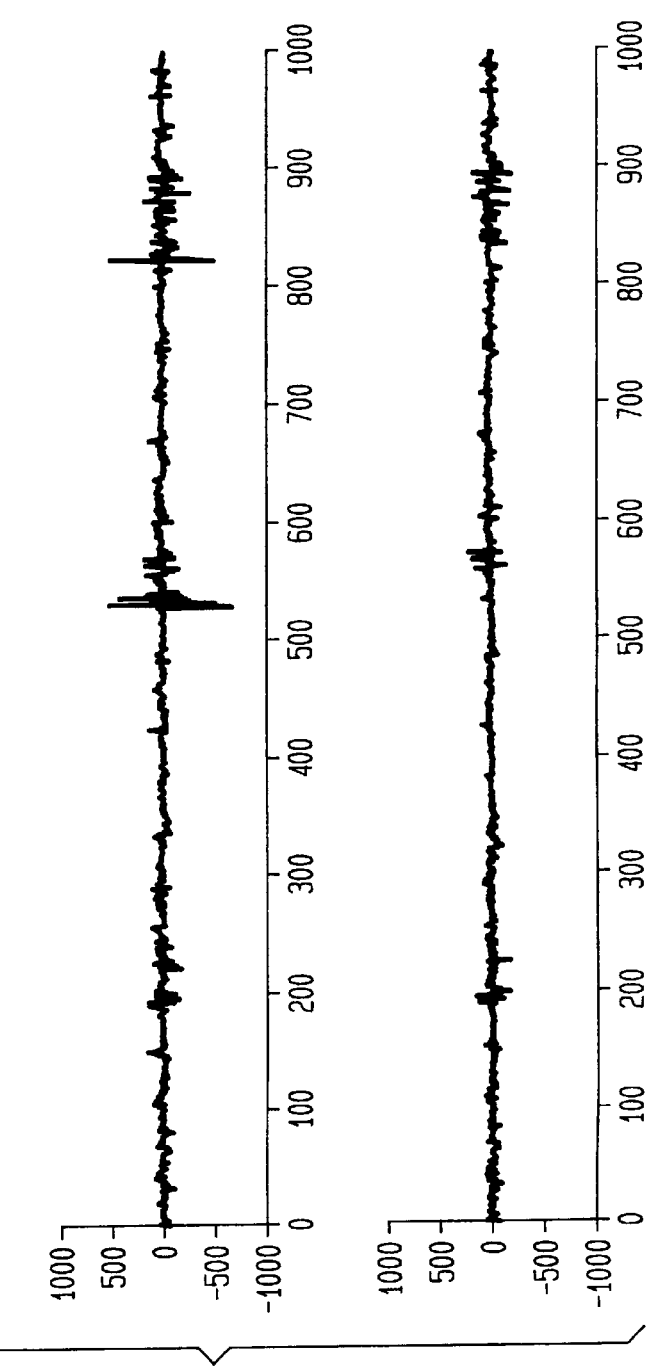

The crackle removal part of the tracker clipper attempts to detect highly non-linear echo in the incoming channel, probably resulting from additional diverging echo cancelers in the communications link between the outgoing and incoming channels. To achieve crackle removal, the power of four consecutive incoming 10 msec. speech frames is stored in an array TotPowIn[ ], as shown in FIG. 16a. Crackle is detected when the two conditions shown in FIG. 16b are met. These two conditions look for abrupt power changes between consecutive incoming speech frames. By abrupt power change is intended an amplitude spike or impulse which is not characteristic of speech or speech echo and so is distinguishable from speech or echo. When the two conditions are met, the incoming speech channel is clipped (replaced with noise fill) for the next 30 msecs. FIG. 16c shows an example where the tracker clipper has detected crackle around the 500–600 and 800–900 time indices and replaced it with background noise fill.

Now, the echo removal will be discussed in further detail. The echo removal portion of the tracker clipper algorithm attempts to detect echo in the current processing time of the incoming channel. Referring to FIG. 17a, the tracker clipper logic depends on the inputs shown. Referring to FIG. 17b, the variables listed are calculated by the tracker clipper algorithm and are used to determine when to clip the echo from the local talker's inbound signal.

Cepstral distance (cep_dist) relates to a spectral distance between the incoming and outgoing channels and is calculated from the linear predictive model (lpc) model of the incoming channel and the lpc model of the outgoing channel at the measured echo delay (L=lpc model order) and in accordance with the formula of FIG. 18 where:

lpc[n]: linear predictive model (order L) for the present speech frame of the incoming channel, and lpc_us[ntau]: linear predictive model (order L) for the delayed (as calculated by the echo delay estimate) speech frame of the outgoing channel.

The pseudo-code of FIGS. 19a–22 summarizes the conditions that need to be met to declare that the current 10 msec incoming speech frame as echo. FIG. 19b provides an incoming versus outgoing channel power spectrum for a cepstral distance of 0.22 and FIG. 19c provides an incoming versus outgoing channel power spectrum for a cepstral distance of 1.06. Notice that the former FIG. 19b shows a practically aligned power spectrum at cepstral distance of 0.22 for incoming and outgoing. Also, the spectral matching condition is marginally met in FIG. 19c. For the tracker clipper to start its clipping mode, ideally there should be spectral matching between the incoming channel and the delayed outgoing channel according to the cepstral distance. Algorithm blocks 1 and 2 of FIG. 19 relate to spectral matching and in particular to the additional conditions besides spectral matching that must be met to start clipping a detected echo.

FIG. 20 provides algorithm blocks 3, 4 and 5 for clipping when there is no spectral matching. Block 3 is executed when both channels have been declared as speech but no spectral matching has been detected. Block 4 is executed when the outgoing channel has been declared as noise and the incoming channel has been declared as speech. Block 5 is executed when both incoming and outgoing channels are declared as noise. FIG. 21 provides additional clipping conditions, steps 6 and 7. Block 6 clips a previous non-clipping sample if in between two clipping samples. Block 7 contains additional conditions to keep clipping if, in the previous incoming speech frame, echo was detected. FIG. 22 provide conditions for disabling clipping as algorithm blocks 8, 9 and 10. Block 8 attempts to identify the beginning of far-end speech in the incoming channel to then disable clipping. Blocks 9 and 10 attempt to identify a double-talk condition to also disable clipping by resetting a clip_echo flag. At the end of the tracker clipper algorithm, if the clip_echo flag is set then the incoming speech frame output will be clipped, otherwise it will be passed untouched.

Further clipping conditions will be described in the subsequent discussion of FIG. 27 providing an overview of the present invention and, moreover, descriptive of the elimination of a residual echo effect, not corrected by the clipper described above.

Figures 23A, 23B:
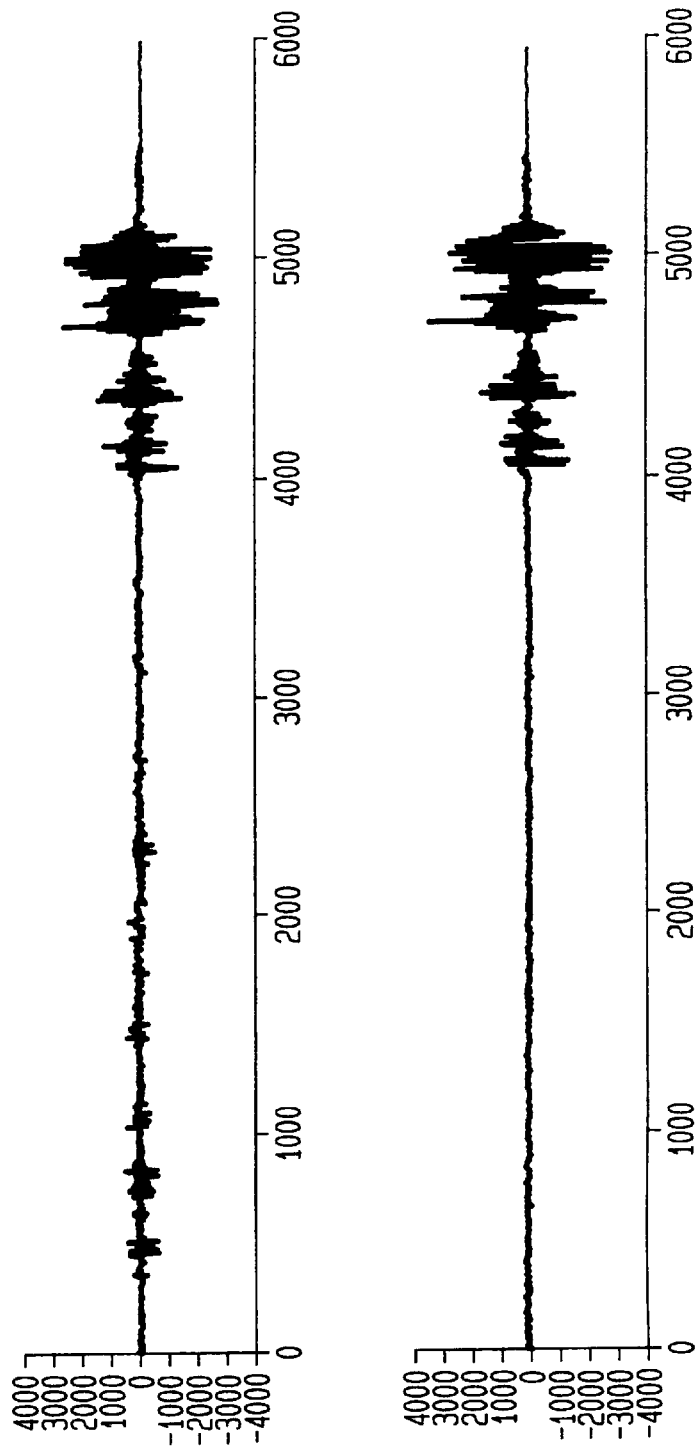
FIG. 23a shows a time series before echo removal and FIG. 23b shows a time series after echo removal and noise restoration.

FIG. 23 shows a segment of time series data where the tracker clipper has detected echo with conditions from algorithm blocks 1 through 7 (except block 2) and is an example of the echo removal algorithm. FIG. 23a provides a time series before echo removal where the incoming speech signal is between 4000 and 5500 and the undesirable echo is between 0 and 3500. FIG. 23b shows a time series after the echo is removed and noise has been used to fill the gaps where the echo was.

Now, the noise fill algorithm will be discussed in some detail with reference to FIGS. 24–26. FIG. 24 provides the inputs to the noise fill process. The noise fill algorithm attempts to match the noise background in the incoming channel whenever a clipping condition has been detected (for example, the tracker clipper for the echo removal).

The pseudo code for the noise_fill() subroutine is shown in FIG. 26a. The noise fill algorithm stays in initialization mode until 80 milliseconds of consecutive incoming "real noise" frames are detected and stored in the Noise[] array (excluding DCME noise frames). While in the initialization mode (Nfill=0), any noise fill needed because of clipping is done by zeroes filling. After initialization (Nfill=1), the noise fill matches the noise background in the incoming channel. Two types of noise fill are described herein; however, the algorithms may be supplemented with further noise types than tonal and white noise if desired.

The first step of the noise fill algorithm is to characterize the noise as one type or another. Referring to FIG. 25a, there is provided an algorithm for determining whether the noise fill should be tonal or white noise fill. As shown, the noise characterization is based in the frequency and time domain characteristics of the collected incoming channel noise. If the spectrum of the collected incoming channel noise meets a power threshold criteria and the time series of the collected incoming channel noise meets a correlation threshold criteria, then the noise is classified as tonal with Nperiod representing the time period of the tonal noise. If either of the two criteria is not met, then the noise is classified as white and Nperiod is set to 800. The values of lag1 and lag2 are chosen to enable tones between 33 Hz and 2666 Hz to be detected. FIG. 25b shows an example of the power spectrum for tonal and white noise. FIG. 25c shows an example of the autocorrelation for tonal noise.

Once the noise is characterized, for white noise fill, the fill is generated by randomly selecting samples from the Noise[] array. FIGS. 26b and 26c show examples of generated white noise fill from the Noise[] array.

For tonal noise, the fill is generated by incrementally selecting samples from the Noise[] array modulus for the tone duration stored in the Nperiod variable. For both types of fill, the power of the fill will match the minimum of the power of the Noise[] array or the output power of the previous speech frame. FIGS. 26d and 26e show an example of tonal noise fill generated from the Noise[] array.

Figure 27A:
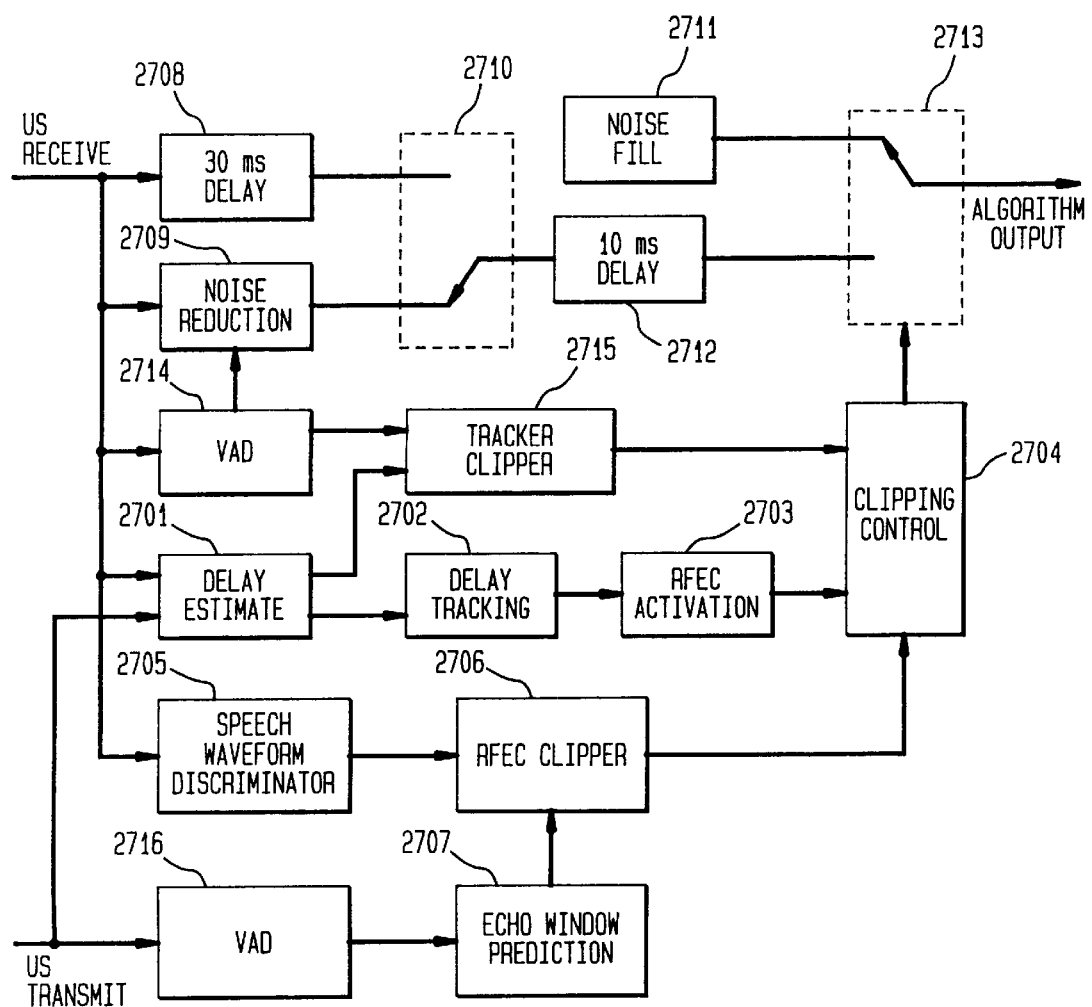
FIG. 27a provides the overall functional description in the form of a functional block diagram.

FIG. 27a provides an overview of the present invention in a system for further providing noise reduction and improvement. The far end receive path enters at the top left of the drawing and the near end transmit is shown at the lower left. A simple voice activity detector, well known in the art, is provided for each path at boxes 2714 and 2716 respectively. In the absence of voice activity in the receive path, a noise reduction algorithm is provided, for example, in accordance with U.S. patent application Ser. No. 08/160,770 filed Nov. 30, 1993 and continuation-in-part U.S. patent application Ser. No. 08/455,932 filed May 31, 1995 of Woodson D. Wynn.

The tracker clipper of the present invention described above is shown at box 2715 for actuating clipping control box 2704 in accordance with a delay estimate calculation at box 2701. Delay tracking as described above is shown as box 2702 for providing an input to residual far end clipping (RFEC) actuation box 2703. A speech waveform discriminator box 2705 acting on the receive path provides an input to RFEC clipper 2706 which in turn actuates clipping control 2704. As will be described further below, the voice activity detector in the transmit path 2716 provides an input to an echo window prediction process and it in turn to RFEC clipper 2706.

Residual echo effects can appear in incoming frames from the far end. Residual far end echo is characterized as having a lack of linear relationship to a reference voice signal; it is of low energy, bursty, short in duration, sporadic and discontinuous. Consequently, the RFEC clipper operates based on its own set of measures including ramping in signal power, clipping status of the tacker clipper 2715 and the likelihood of voiced speech from detector 2716. While the tracker clipper 2715 uses long term averaging of the coherence calculations as described above, the RFEC clipper does not use coherence. Per FIG. 27c and 27d, the RFEC clipper keeps a ruing estimate of the received signal level for, for example, 100 ms in a circular buffer of 10 frames. In each frame, the signal power for frequencies below 2000 hertz, where the most speech energy is concentrated, is calculated and an estimate of signal level derived based on a set of fixed thresholds around an expected level of residual echo. The estimate of signal level reduces the fluctuation of signal power for ramp detection. Referring to FIG. 27c, a power ramp decision is then made when a weighted running estimate of the signal levels of, for example, five overlapping, interleaved frames in the circular buffer is above the threshold (i.e. 22222). Referring to FIG. 27d, the weighted signal level of the 100 ms worth of speech signal is calculated using the following formula:

```
Weighted
signal level = (signal level of t+4 frame)*10000 +
               (signal level of t+2 frame)*1000 +
               (signal level of t   frame)*100 +
               (signal level of t-2 frame)*10
               (signal level of t-4 frame)*1
```

The weights of the frames in the circular buffer are assigned by the sequence the frames are received. Because the algorithm has a processing delay of four frames, if the frame at time "t" is the output frame, then the t+4 frame at time, t+4, is the currently received frame. Frames t-1, t-2, . . . , t-5 are the frames that are already output in time. If the tracker clipper 2715 does not clip a frame and the signal power is above the predetermined threshold or the power level indicates a power ramp in an echo window (yet to be described in detail), the RFEC clipper 2706 will not process the frame and pass it through.

If the signal level is below the residual echo threshold and has no voiced speech characteristic (i.e. formant detection per FIG. 27e), or the signal has a duration less than 50 ms in the echo window, the RFEC clipper 2706 will remove the bursty residual echo signal and replace it with appropriate noise fill (provided by box 2713). Referring to FIG. 27e, the decision of voiced speech is preferably made by formant detection in the voice signal spectrum. The presence of formant is indicated by the spectral peak and the closeness of two adjacent line spectrum frequencies (LSF) derived from the linear prediction calculation (LPC) of each voice signal frame. FIG. 27e shows the spectrum of a voiced speech signal, the spectrum envelope of LPC and ten line spectrum frequencies (LSF's) derived from the LPC. For example, a spectral peak indicated by the first pair of LSF's from the left shows a formant frequency at about 480 Hertz; the third pair of LSF's from the left indicates another formant at about 1700 Hertz.

Figure 27B:
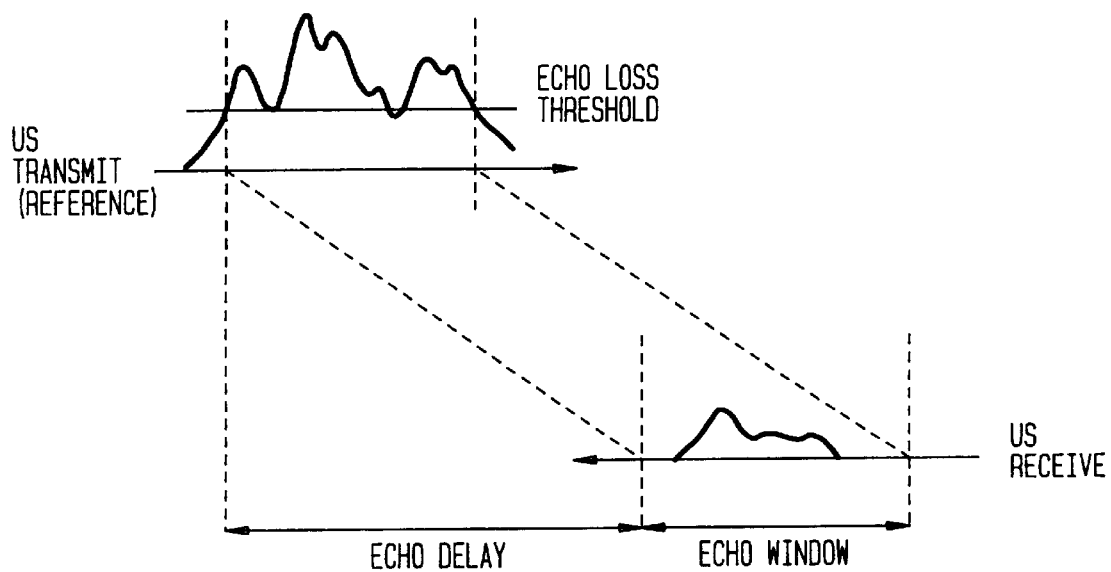
FIG. 27b shows the echo window prediction process for residual echo clipping.
Figures 1, 27C:
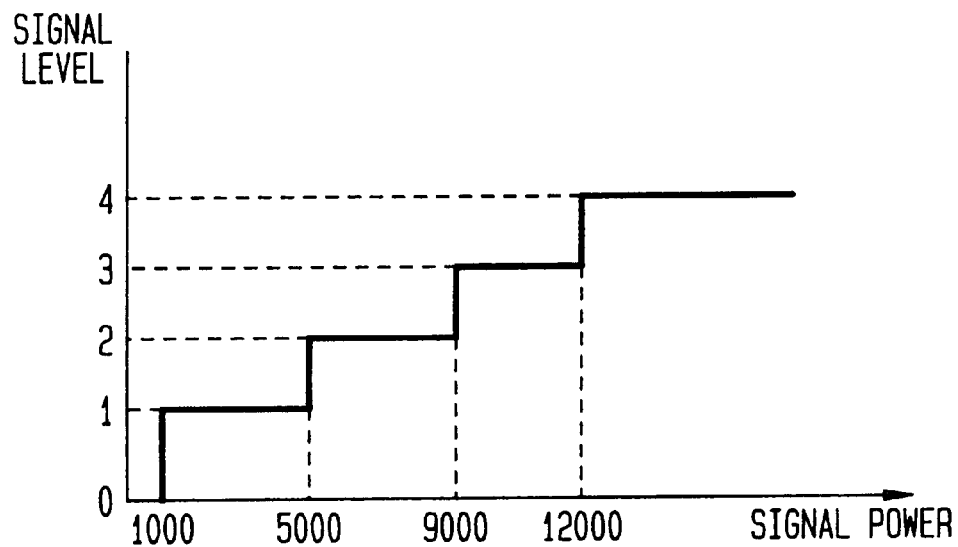
FIG. 27c shows the detection of speech power level where FIG. 27c(1) shows signal power versus signal level and FIG. 27c(2) shows speech signal level sampling over signal frame in 100 ms estimate windows.
Figures 2, 27C:
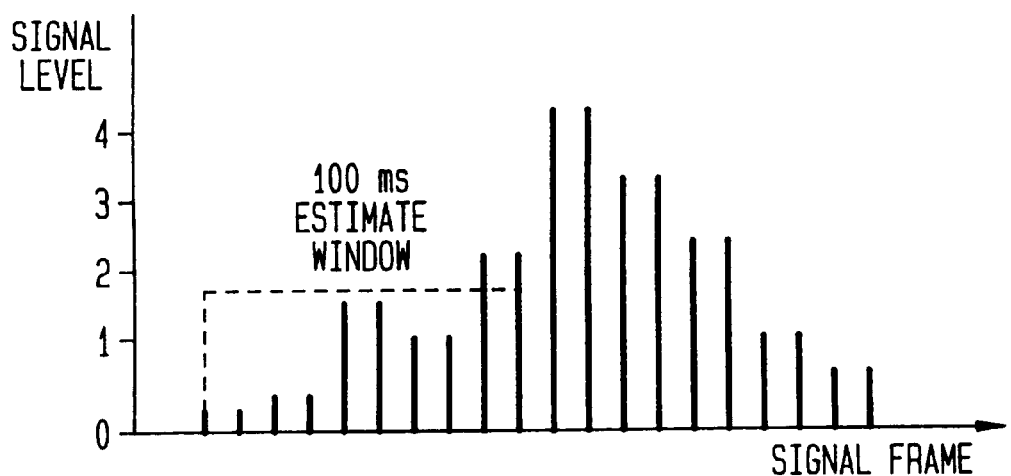
Figure 27D:
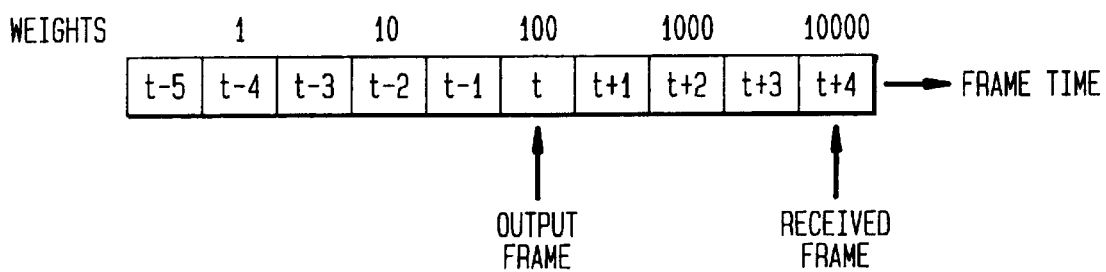
FIG. 27d shows the formation of a running estimate window and FIG. 27e shows speech spectrum (0–4000 Hz) versus power level.
Figure 27E:
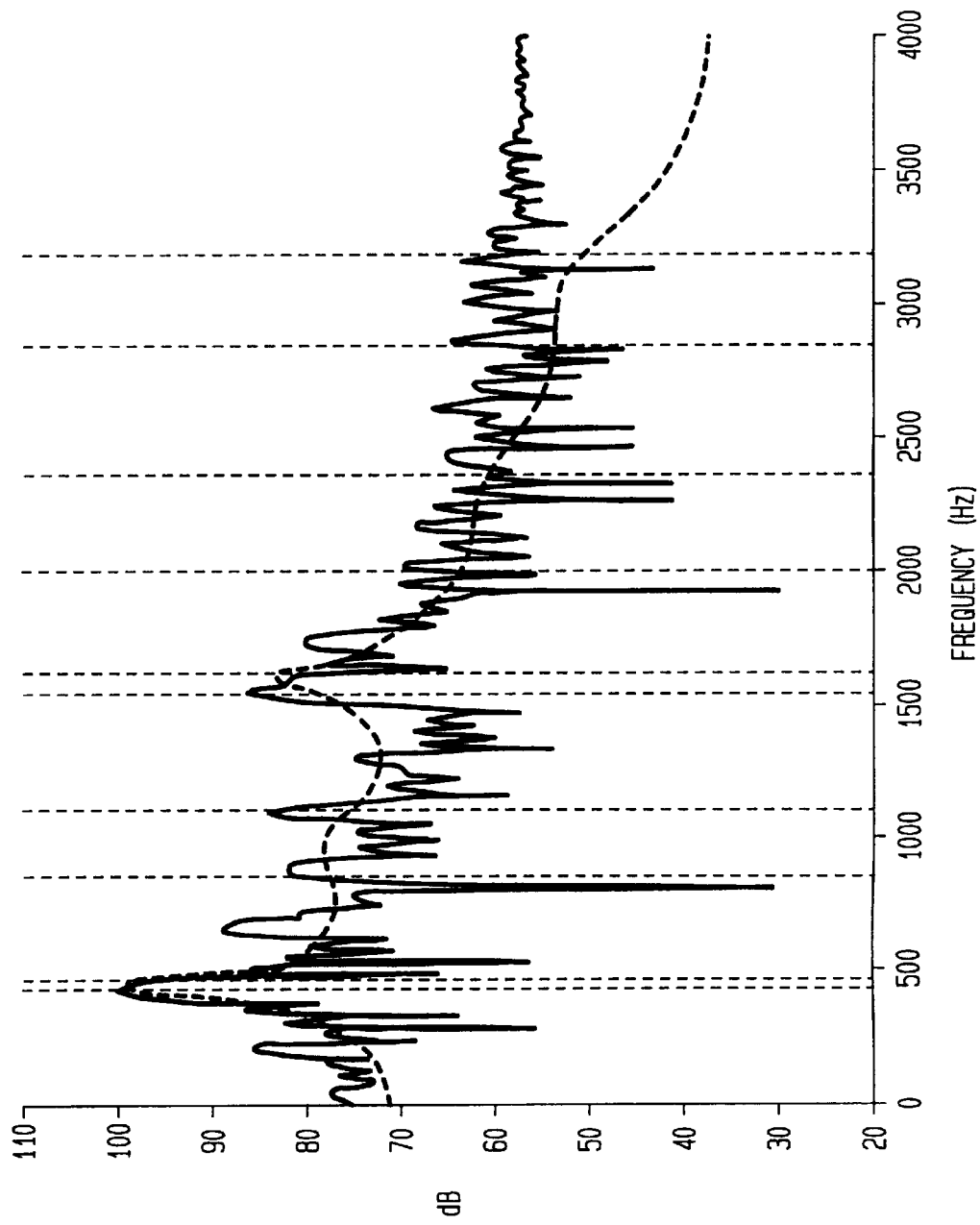

Referring briefly to FIG. 27b, when echo is detected and the RFEC algorithm is activated, a measure of time interval in which echo may occure called an echo window is derived as shown from the reference power level (i.e. the near end transmit), the measured echo delay, the voice detection, and the echo loss level. The RFEC clipper 2706 also measures the activity of the tracker/clipper 2715 in the echo window. If the tracker clipper 2706 stops clipping in an echo window in which it has been active removing echo, then, the RFEC clipper will continue to clip signal in the frames that have no formant detection. Now each of boxes 2701–2707 will be discussed individually.

Box 2701 is the coherence calculation described above in respect to FIGS. 6 and 8 for measuring echo delay between the transmitted and received signals. The calculation results from box 2701 are tracked at delay tacking box 2702 to generate a stable estimate of echo delay in milliseconds. If the delay is within the range of, for example, 200 to 1000 milliseconds, then the RFEC activation control box 2703 enables the clipping control box 2704 to initiate echo removal and noise fill via switches 2710 and 2713 for both the tracker clipper box 2715 and the RFEC clipper 2706. The residual far end echo clipper 2706 operates via the same clipping control function 2704 and thus clips when tracker clipper 2715 is not.

Clipping control 2704 controls the output of the algorithm, When the clipping control 2704 is actuated by RFEC activation 2703, control flags from the tracker clipper 2715 and the RFEC clipper 2706 can be set accordingly when a signal frame needs to be clipped. If a clipping flag is set, clipping control 2704 operates switches o replace the signal frame with appropriate noise fill 2711. If no clipping flag is set, the received signal output of switch 2710 is passed through unprocessed by the present algorithm with a fixed 10 ms delay (to compensate for processing time). In a similar manner, 30 ms delay 2708 compensates for noise reduction 2709 depending on the switch position of switch 2710.

Now the speech waveform discriminator box 2705 will be discussed. The speech waveform discriminator 2705 measures whether the input or received signal frame contains voiced speech or power ramping. Referring again to FIG. 27e, for each frame, the measurements of signal power of frequencies below 2000 hertz and spectral peak levels from the first two pairs of adjacent line spectrum frequencies are calculated. Referring to FIG. 27c, if the power level is above the threshold and shows an increase when compared to its 100 millisecond history, a power ramping flag is set for the current signal frame. If the spectral peak levels are above the threshold, a formant detection flag is set. The measurements are maintained in a circular buffer for 100 milliseconds (i.e. 10 frames).

The RFEC clipper 2706 takes the measurements from speech waveform discriminator 2705 and determines whether the received signal should be clipped or not when the echo window is indicated by echo window predictor 2707 (per FIG. 27b). If the signal level is below the residual echo threshold and has no voiced speech characteristic (i.e. formant detection) or the signal has a duration of less than 50 milliseconds in echo window, a flag will be set in the clipping control 2704 to clip the signal.

Referring to FIG. 27b, when echo is detected and the RFEC algorithm is activated, echo window predictor 2707 predicts the time interval of the received signal in which the residual echo may occur. Because the residual echo is non-linearly distorted, it has no resemblance to its original signal and coherence calculations cannot be used as a predictor. The echo window is derived from the reference power level from the near end transmit, the measured echo delay from delay tracking 2702, the voice detection from the voice activity detector 2716 and the echo loss level from delay tracking 2702.

Thus, there has been shown and described an algorithm for implementation as a far end echo control algorithm for detecting echo (either strong or weak), tracking the echo, removing the echo including residual echo effects and filling the gap of the removed echo with one or another type of detected noise at an appropriate level. The present invention may be usefully applied inside and outside the telecommunication arts. All United States patents or patent applications referenced herein should be deemed to be incorporated by reference as to their entire contents. The scope of the invention should only be deemed to be limited by the claims that follow.

What we claim is:

1. Apparatus for processing telecommunications signals generated during a voice communication between a local talker and a remote talker, the apparatus comprising
    a signal processor for processing samples of the telecommunications samples and
    a circular buffer for storing the telecommunications signal samples, wherein said signal processor comprises a plurality of software modules having a top-down control structure.

2. A method for processing telecommunications signals generated during a voice communication between a local talker and a remote talker, said method comprising the steps of
    storing communication signal data in at least two circular buffers and allocating real time processing tasks between 1) computing and averaging power spectra and cross spectra and 2) computing coherence wherein a first circular buffer store and a second circular buffer store overlapping blocks of samples of near end and far end signals respectively and further comprising the step of indexing the circular buffers.

3. A method for processing telecommunications signals generated during a voice communication between a local talker and a remote talker, said method comprising the steps of:
    storing communication signal data in at least two circular buffers and allocating real time processing tasks between 1) computing and averaging power spectra and cross spectra and 2) computing coherence further comprising the step of organizing signal delay calculation data into data structures.

4. A method of processing telecommunications signals generated during a voice communication between a local talker and a remote talker, said method comprising the steps of
    organizing input data streams of near-end and far-end data into circular and non-circular buffers,
    calculating delay corresponding to maximum coherence between near-end and far-end data and
    determining the location of echo responsive to said delay calculation step.

5. A method as recited in claim 4 further comprising the steps of clipping said echo and replacing said echo with noise fill.

6. A method as recited in claim 4 further comprising the steps of locating crackle and replacing said crackle with noise fill.

7. A method as recited in claim 4 further comprising the steps of detecting voice activity, predicting an echo window and locating a residual echo effect.

8. A method of processing telecommunications signals to alleviate echo occurring during a voice communication between a local talker and a remote talker comprising the steps of
    storing said telecommunications signals in at least two circular buffers,
    detecting echo in said stored telecommunications signals,
    tracking said echo wherein said tracking step comprises the substeps of matching the power spectra of an incoming and an outgoing channel and determining a clipping condition of power level from the power spectral matching,
    removing said echo and
    filling said echo gaps with noise.

9. A method of processing telecommunications signals to alleviate echo as in claim 8 further comprising the step of
    detecting highly non-linear echo in the incoming channel and
    if detected, clipping the incoming channel from the remote talker.

10. A method of processing telecommunications signals to alleviate echo as in claim 8 further comprising the steps of
    tracking noise,
    determining which of at least two types of noise is present and
    said step of filling removed echo gaps with noise further comprises the step of filling said gap with noise of the determined type.

11. A signal processing method as in claim 10, the noise determining step comprising the step of characterizing the noise between tonal noise and white noise.

12. A signal processing method as in claim 11, the noise filling step for tonal noise comprising the step of generating tonal frequencies within the voice frequency range.

13. A method of processing telecommunications signals to permit clipping of a detected echo comprising the steps of
    detecting echo wherein said detecting step comprises the substeps of
    storing a coherence histogram for averaged telecommunications channel delay coherence and
    detecting the occurrence of echo from the event of peaks on the coherence histogram exceeding a coherence threshold,
    calculating a cepstral distance,
    matching the power spectra of an incoming and an outgoing channel and
    determining the clipping conditions of delay and power level from the power spectral matching.

14. A method as recited in claim 13 further comprising the preliminary steps of Hanning windowing the incoming and outgoing channels, fast Fourier analysis and decimating the fast Fourier analysis results.

15. A method for detecting the occurrence of echo in a telecommunications channel comprising the steps of:
    storing a coherence histogram for averaged telecommunications channel delay coherence and
    detecting the occurrence of echo from the event of peaks of the coherence histogram exceeding a coherence threshold.

* * * * *